(12) United States Patent
Dreher

(10) Patent No.: US 10,107,282 B1
(45) Date of Patent: Oct. 23, 2018

(54) ARTICULATED RECIPROCATING COUNTERWEIGHT

(71) Applicant: George R Dreher, Midland, TX (US)

(72) Inventor: George R Dreher, Midland, TX (US)

( * ) Notice: Subject to any disclaimer, the term of this patent is extended or adjusted under 35 U.S.C. 154(b) by 0 days.

(21) Appl. No.: 15/789,760

(22) Filed: Oct. 20, 2017

Related U.S. Application Data

(60) Provisional application No. 62/535,945, filed on Jul. 23, 2017, provisional application No. 62/535,846, filed on Jul. 22, 2017, provisional application No. 62/426,337, filed on Nov. 25, 2016, provisional application No. 62/421,410, filed on Nov. 14, 2016, provisional application No. 62/411,556, filed on Oct. 22, 2016, provisional application No. 62/403,165, filed on Oct. 2, 2016.

(51) Int. Cl.
*F04B 47/14* (2006.01)
*E21B 43/12* (2006.01)

(52) U.S. Cl.
CPC ............ *F04B 47/14* (2013.01); *E21B 43/127* (2013.01); *F04B 47/145* (2013.01)

(58) Field of Classification Search
CPC ..... F04B 47/14; F04B 47/145; Y10T 74/2156
See application file for complete search history.

(56) References Cited

U.S. PATENT DOCUMENTS

| | | | | |
|---|---|---|---|---|
| 2,190,070 A | * | 2/1940 | Holzer | F04B 47/02 74/41 |
| 3,016,767 A | * | 1/1962 | Egan | F16F 15/28 361/167 |
| 3,209,605 A | * | 10/1965 | Scoggins, Jr. | F04B 47/02 74/41 |
| 3,230,782 A | * | 1/1966 | Harryman et al. | E21B 43/12 74/41 |
| 4,377,092 A | * | 3/1983 | Garmong | F04B 47/028 74/41 |
| 4,660,426 A | * | 4/1987 | Mosley | F04B 47/14 74/41 |
| 6,386,322 B1 | * | 5/2002 | McCormick | E21B 43/127 185/33 |

FOREIGN PATENT DOCUMENTS

CN 2358251 Y * 1/2000

* cited by examiner

*Primary Examiner* — Daniel J Colilla

(57) ABSTRACT

A moving counterweight that reduces lifting and lowering torque of an unbalanced load. In one embodiment, a beam pump, an articulated reciprocating counterweight extending above the effort of a class 1 lever on extended pitman arms above the lever effort at the tail bearing to structurally and continuously changes it's position in an air-arc to reduce lifting and lowering torque, by rigid-mechanical geometric re-positioning of the counterbalance effect to and fro, when the rotation is crank arms falling toward the well load, thus mechanically, continuously, favorably, and without friction re-positioning the counterweight either away from the load and fulcrum thereby increasing the counterbalance effect, or nearer to the load and fulcrum thereby decreasing the counterbalance effect, as is desirable to compensate the unbalanced downhole load, where the load in the lift direction exceeds the load in the return direction. The longer the extension of the pitman arm above the beam with the counterweight attached the greater is the counterweight effect of the counterweight deadweight.

21 Claims, 19 Drawing Sheets

ARTICULATED RECIPROCATING COUNTERWEIGHT

CROSS-REFERENCE TO RELATED APPLICATIONS

This application claims priority to and the benefit of the filing of U.S. Provisional Patent Application No. 62/411,556, entitled-"POSITION CHANGING EXTENDED COUNTERWEIGHT", filed on Oct. 22, 2016; U.S. Provisional Patent Application No. 62/403,165, filed on Oct. 2, 2016; U.S. Provisional Patent Application No. 62/421,410, filed on Nov. 14, 2016; U.S. Provisional Patent Application Ser. No. 62/426,337, filed on Nov. 25, 2016; U.S. Provisional Patent Application Ser. No. 62/535,846, filed on Jul. 22, 2017; U.S. Provisional Patent Application Ser. No. 62/535,945, filed on Jul. 23, 2017; and U.S. Non-Provisional patent application Ser. No. 15/719,964, filed on Sep. 29, 2017; and the specifications and claims (if any) thereof are incorporated herein by reference.

BACKGROUND OF THE INVENTION

Field of the Invention (Technical Field)

Embodiments of the present invention relate generally to improved efficiency for lifting and lowering unbalanced loads.

Description of Related Art

Lifting and lowering of loads has often been facilitated with the use of counterweight (counterbalance) to offset the load, in a manner to reduce the required force to raise and lower the load with the counterweight to be in some state of balance. Whether as in the intentionally unbalanced state, for example, in the Trebuchet beam, a fulcrum machine where a counterweight heavier than the load causes a beam with a fulcrum point to hurl a missile projectile from the opposite lighter beam end when the much heavier counterweight end drops; or in intentionally balanced modes, for example, an elevator, or a beam well pumping unit, often referred to as a "pump jack", the term "net force" or other synonyms can be used to describe a quantity of positive or negative force required to raise or lower a load after factoring in an attempt to balance or unbalance with counterweight in order to lighten or increase the load. "Gross torque" and other synonyms can be used to describe a quantity of torque required to raise or lower a load without or before an attempt to balance or unbalance with a counterweight—for example, a weight lifting exercise machine whose very purpose is to be heavy.

Gravity is the natural force being countered with the machine's counterbalance force, so with a fixed amount of load and fixed amount of counterweight the machine's required force is relatively constant. Some designs have attempted to improve lifting efficiency in various ways: by varying the angles of pull in the pulling machine, varying the length of linkages in the pulling machine, varying the size of pulleys in the pulling machine, and/or varying the speed reduction of pull in the pulling machine. In the case of beam pumping units which raise and lower a more or less vertical load there is a tipping (fulcrum) point and counterweight effort and load is intended to be in a close state of balance.

Machines designed to do heavy lifting are big and expensive and repairs on worn parts are expensive. The less force that is needed to accomplish the desired work, the smaller the machine components can be, and the less energy can be consumed accomplishing the work, and the less wear and tear on the machine occurs, and all this results in less expense to operate the machine, so designers have tried force-reducing designs in order to improve the economics of the lifting work.

Now we describe some design attempts to reduce the required lifting forces that are variations of both adjustable crank weight and beam weight "conventional" center tipping (fulcrum point) class 1 lever geometry and class 3 lever geometry (rear tipping-fulcrum point) that have attempted to reduce required counterweight in beam well pumping which in operation converts rotary motion of the prime mover, speed reducer, and crank arms, to vertical reciprocating motion of the pitman arms connected to the beam in order to facilitate rod pumping. Besides conventional class 1 geometry these variations can be front-mounted with rear fulcrum points as a class 3 lever, as in the first 1920s air balance units which still use air cylinder pressure as counterweight, and Parkersburg's "Monkey Motion" with fourteen bearing points which was entirely beam weighted with no crank arm weights which made the larger size beam weights bulky. However, both these designs allow more constant effective counterbalance than crank weighted with rotary motion counterweights as used in the 1930s "grasshopper" (Mark II) with class 3 rear fulcrum.

Deeper wells required more counterweight so massive units came of age in the early 1970s when the first sales order for the Mark II 1280 for Union Oil well in Farnsworth, Tex., was obtained by E. L. Hudson which started the era of massive crank weight pumping units when the Mark II's inventor Walter Trout instructed his engineer Joe Byrd to further refine the grasshopper design to accept the largest phased crank counterweight unit ever, and so came the first Mark II 1280.

The problem is that in beam pumped wells the lifted weight is about 1.5 times the weight of the lowered weight due to lifting the weight of the fluid plus the buoyant weight of the sucker rods in the pipe when lifting, but the fluid weight is then held by the downhole pump standing valve when lowered making lifting and lowering unbalanced, so in known references, the difference in counterweight required is split on the up stroke and down stroke which leaves significant unresolved net torque due to the unsolved unbalanced downhole condition.

With conventional beam units, massive effective counterweight is achieved with leverage of adjustable crank weight. But purely beam weighted units were built by Parkersburg and Cabot and others because the effective beam weight is direct and is more constant than rotary crank weight.

A phased crank design for conventional beam unit with class 1 lever center fulcrum point was published by George Eyler and Cabot Corporation in 1963. And an advanced geometry design was published by Bob Gault and Bethlehem Supply in 1965. These design elements require operating the unit in one direction only and mainly address effective counterweight applied to torque factor, which is a crank angle based multiplier from unit geometry that affects torque calculation at the speed reducer, and sometimes is able to reduce torque over "conventional" designs.

But, the air balance design can reverse direction and the gear teeth in the speed reducer are known for long life. This is partly because with easily adjusted air pressure the counterweight balance is easily maintained close to equal on upstroke and downstroke.

The Curtis Mitchell (American Mfg.) 1958 motorized screw adjustable beam mounted counterweight used motor amp readings to adjust to the desired position on the rear of the beam to "balance" the unit but reportedly the inevitable damage to threads on the screw caused problems. A more recent design uses a weight mounted on a drop-down lever extending at the rear of the beam that is intelligently moved up and down with a motorized screw in real time based on amp readings and claims ability to achieve fine tune counterbalance within 10% of the desired amount. Another recent geometric variation uses a radically dropped lower down end of beam weight.

In 1984, Sam Gibbs introduced a wave equation that allowed well controllers to shut off pumping units when fluid in the well bore was low. Thus, variable frequency drives were introduced to seek better efficiency by slowing the pumping units or shutting them off when fluid in the well bore was low.

All the designs mentioned can achieve a fairly limited increase in efficiency but still leave the problem of downhole unbalanced weight between lifting and lowering. So, there's much room for improvement—including the need for much greater efficiency regarding reduction of torque and net torque, in order to achieve longer lasting components, and reduced operating expense, reduced power consumption, longer stroke lengths and smaller speed reducers.

BRIEF SUMMARY OF EMBODIMENTS OF THE PRESENT INVENTION

Embodiments of the present invention relate to lifting and lowering loads more efficiently and also more economically than known systems. This invention is the continuous movement by mechanical means of an extended counterweight to a desired advantageous position at a desired advantageous moment to achieve a desired reduced net torque when lifting or lowering an unbalanced load with a beam with a fulcrum and connected to a load and an effort.

In one embodiment, a walking beam well pumping unit, the lifting and lowering of the well load can be caused by the reciprocating motion of a beam tipping on a fulcrum counterbalanced with an extended counterweight.

In one embodiment, when maximum counterweight effect for lifting the unbalanced well load is desired, which occurs at the same time as lowering the crank arm, the extended counterweight is swayed away from the fulcrum thereby increasing the counterbalance effect. Vice versa, when minimum counterbalnce effect for lowering the well load is desired, which occurs at the same time as lowering the crank arm, the extended counterweight is swayed nearer the fulcrum of the beam thereby reducing the counterbalance effect.

In one embodiment, increased and reduced counterbalance effect exactly coincides with the increased counterbalance effect required to raise the rods and the decreased counterbalance effect required to lower the rods, due to raising the rods requiring lifting the weight of the rods in fluid plus the weight of the fluid, and lowering the rods requiring only the weight of the rods in fluid. Reduced net torque will allow longer life speed reducers, smaller speed reducers, and longer reciprocating vertical stroke length and these are both economic and performance benefits.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

Figure 1:
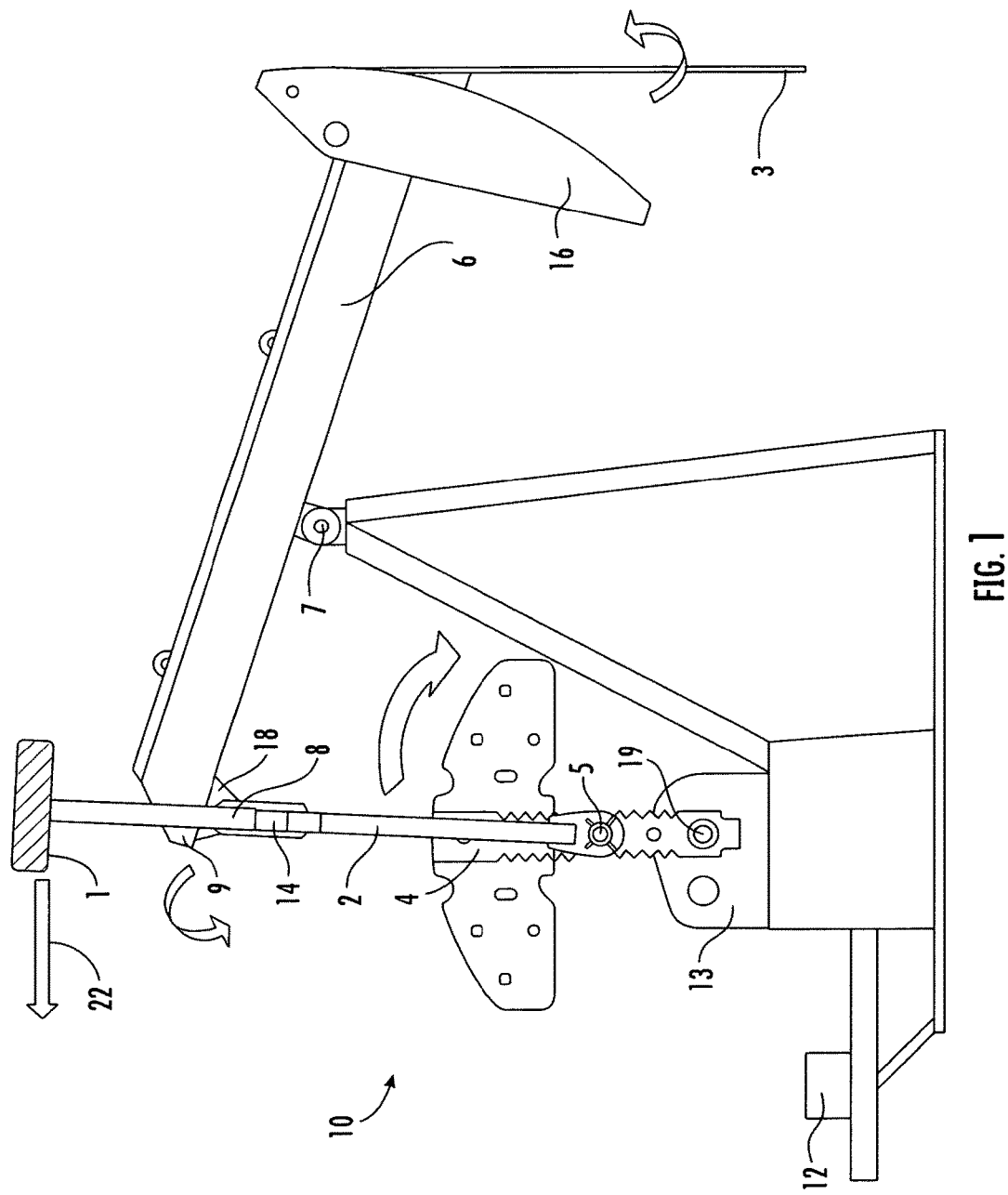
FIG. 1 is a front view of a counterweight assembly according to an embodiment of the present invention wherein the counterweight is positioned neutrally above the lever effort when the crank arm is straight up with the crank rotation toward the well at crank angle 0 degrees and so entering this 0 degree angle with the well load moving downwards but leaving this angle with the well load movement upwards.

DESCRIPTIVE KEY 1 articulated reciprocating counterweight
2 pitman arm
3 well load
4 crank arm
5 wrist pin
6 walking beam
7 fulcrum
8 extended pitman arm
9 effort
10 pumping unit
11 angular extension assembly
12 prime mover
13 speed reducer
14 equalizer cross beam
15 fluid filled reciprocating counterweight
16 head
17 moveable reciprocating counterweight
18 tail bearing
19 crankshaft
20 shell
21 frame
22 air-arc

DETAILED DESCRIPTION OF THE INVENTION

As used throughout this application, the term "articulated reciprocating counterweight" 1 on a beam pumping unit 10 is intended to mean where a counterweight positioned above the walking beam 6 on a secondary lever consisting of extended pitman arm 8, sways in the air in an arc 22 motion as articulated by the rotational motion of crank arm 4 and crank wrist pin 5 about the crankshaft 19 of the speed reducer 13, and this rotational motion converted to linear motion by the pitman arm 2, and the linear motion converted to swaying air-arc 22 motion by the pivot axis tail bearing 18 connecting the equalizer cross beam 14 to the reciprocating walking beam 6 and the extended pitman arm 8 connected to the equalizer cross beam 14.

As used throughout this application, the term "air-arc" 22 on a beam pumping unit 10 is intended to mean where an articulated reciprocating counterweight 1 is extending upward from a pivot axis called a tail bearing 18 on a secondary lever called extended pitman arm 8 to be above and not touching the walking beam 6 so the swaying motion of the articulated reciprocating counterweight 1 forms a frictionless air-arc 22 from a position behind the lever effort which is a pivot axis called tail bearing 18 of the walking beam 6 to a position in front of the lever effort which is the same pivot axis called tail bearing 18 of the beam.

As used throughout this application, the term "counterbalance" is intended to mean the amount of effective weight the dead weight of the block of steel mass called "counterweight" must exert to effect a desired result on a well load 3. The term "weight" and "dead weight" when referring to a "counterweight", is used for the sake of simplicity and is not intended to limit the "counterweight", instead, the term "weight" and "dead weight" when used in the context of the "counterweight" is intended to include any and all manners of a "counterweight", including but not limited to articulated reciprocating counterweight, counter weight and counterweight, fluid filled counterweight, counterweight mass, and moveable counterweight.

As used throughout this application, the term "net torque" is intended to mean the amount of torque that speed reducer 13 or prime mover 29 must exert to effect a desired result on a well load 3. The term "sliding" when referring to a moveable counterweight 17, is used for the sake of simplicity and is not intended to limit the ability to move the counterweight only by dragging or skidding the counterweight, instead, the term "sliding" when used in the context of moving the counterweight is intended to include any and all manners of moving a counterweight across one or more surfaces, including but not limited to moving the counterweight via dragging or skidding it, rolling it with bearings, wheels, or rollers.

As used throughout this application, the term "unbalanced load" on a beam pumping unit 10 is intended to mean where the load in the lift direction exceeds the load in the return direction.

In accordance with embodiments of the invention, the best mode is presented in terms of the described embodiments, herein depicted within FIGS. 1 through 20. However, the disclosure is not limited to the described embodiments and, upon studying the instant application, a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures It should also be understood that when an element is referred to as being "connected" to another element, it can be directly connected to the other element or intervening elements may be present. It should also be understood that the sizes and relative orientations of the illustrated elements are not shown to scale, and in some instances they have been exaggerated for purposes of explanation.

Embodiments of the present invention can be used in conjunction with class 1 levers.

Of the many applications that embodiments of the present invention apply to, now consider an embodiment of the present invention as applied to class 1 lever, in this particular example conventional crank weight walking beam 6 pumping unit 10 where circular motion is transferred from prime mover 12 to speed reducer 13 and rotating crank arm 4 with crank shaft 19 and then converted to linear motion with crank arm 4 crank wrist pin 5 articulated with pitman arm 2 connected through equalizer cross beam 14 with tail bearing 18 to walking beam 6 at the effort 9, and with this teaching speed reducer 13 net torque and prime mover 12 net torque is reduced by extended pitman arm 8 rising above the effort and mechanically structurally positioning the articulated reciprocating counterweight 1 extending upward from pivot axis tail bearing 18 on extended pitman arm 8 above and not touching the beam 6 in a frictionless air-arc 22 nearer to well load 3 and fulcrum 7 to decrease the counterbalance effect, or away from well load 1 and fulcrum 7 to increase the counterbalance effect on both adjustable crank weight pumping units 10 and beam weight only units.

This device reduces the current practice problem of high net torque needed to lift and lower the unsolved unbalanced well load 3 in the current practice of utilizing only stationary weight, by teaching a position-changing articulated reciprocating counterweight 1 extending upward from pivot axis tail bearing 18 on extended pitman arm 8 above and not touching the beam 6 in a frictionless air-arc 22 whose structurally determined and timed position either forward or aft of the effort 9 efficiently reduces lifting or lowering net torque when the walking beam 6 pumping unit 10 crank arms 4 rotational direction is falling towards the well load 1.

FIG. 1 illustrates an embodiment wherein well load 3 is reciprocated by walking beam 6 pumping unit 10 which in this particular example the reciprocating lifted well load 3 weight is about 1.5 times greater than the weight of the lowered well load 3. This is due to lifting the weight of the fluid in the pipe plus the buoyant weight of the rods in fluid when lifting the well load 3, but when lowering the well load 3 the fluid weight is then held by the standing valve in the pipe leaving only the weight of the buoyant weight of the sucker rods in fluid when lowering. Thus in known systems the difference in lifted and lowered weight is split on the up stroke and down stroke which leaves an unbalanced condition and significant net torque remains on surface equipment due to the unsolved unbalanced downhole condition of the current teaching.

FIG. 1 illustrates crank arm 4 straight up at 0 degrees which is a position of low torque factor and articulated reciprocating counterweight 1 is substantially positioned neutrally above effort 9. The front end or well load 3 end of reciprocating walking beam 6 is as low as it goes and so will re-start the cycle of reciprocating upward with crank arm 4 rotating clockwise with well load 3 on the right, and at that moment articulated reciprocating counterweight 1 extending upward from pivot axis tail bearing 18 on extended pitman arm 8 begins changing position to sway above and not touching the beam 6 in a frictionless air-arc 22 away from well load 1 and fulcrum 7 and away from neutral and toward the rear.

Figure 2:
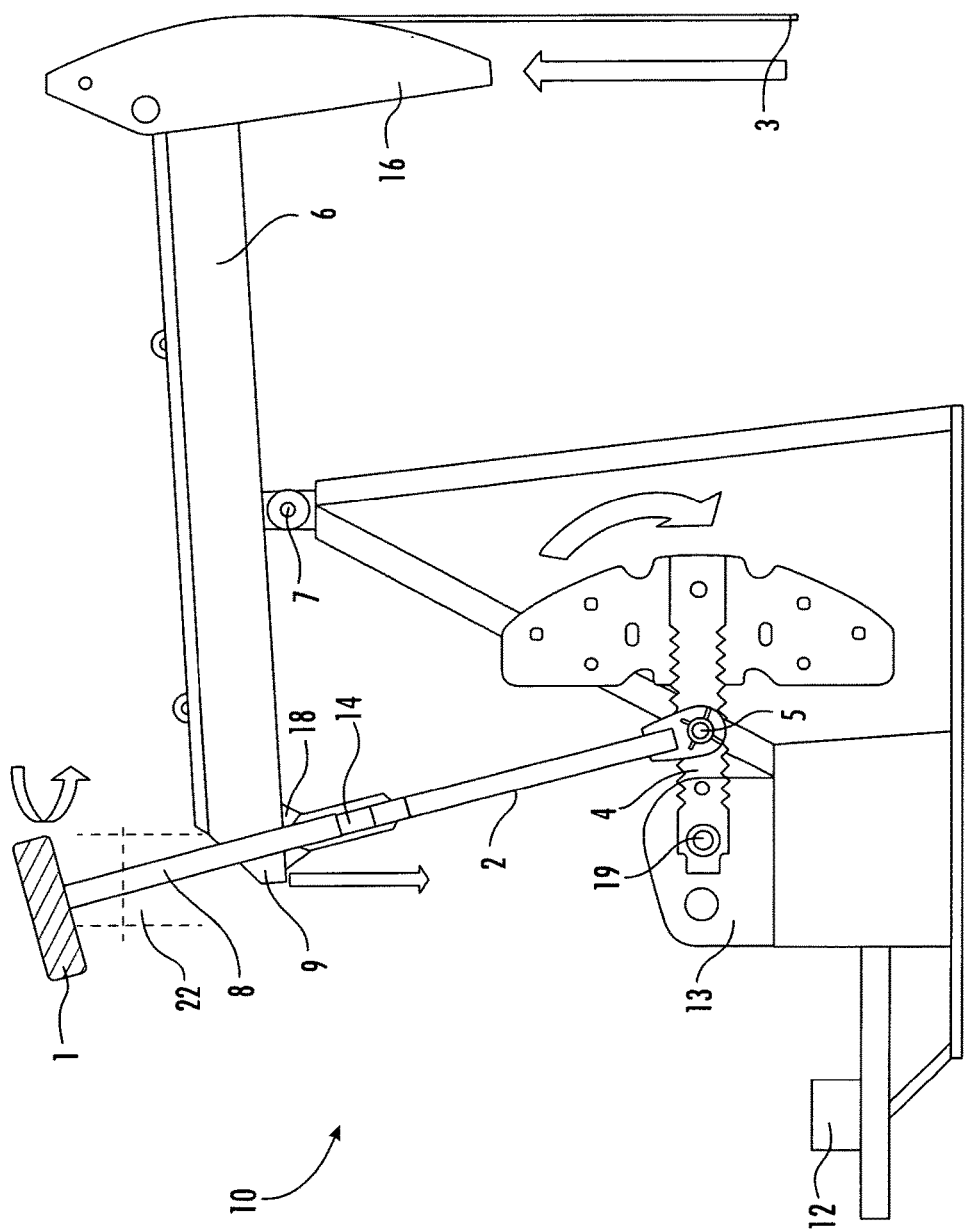
FIG. 2 is a front view of a counterweight assembly according to an embodiment of the present invention wherein the counterweight is positioned to add effective counterbalance wherein the counterweight is behind the lever effort and away from the fulcrum when the crank arm is horizontal toward the well with the crank rotation toward the well at crank angle 90 degrees and so entering this 90 degree angle with the well load moving upwards.

FIG. 2 illustrates articulated reciprocating counterweight 1 away from well load 3 and fulcrum 7 where it causes increased counterbalance effect on the upstroke which is nominally 1.5 times greater than well load 3 weight on the down stroke and thus articulated reciprocating counterweight 1 extending upward from pivot axis tail bearing 18 on extended pitman arm 8 above and not touching the beam 6 is positioned in a frictionless air-arc 22 to reduce net torque from the unbalanced downhole state required to lift and lower well load 3.

FIG. 2 illustrates a class 1 lever walking beam pumping unit 10 with adjustable weighted crank arm 4 falling toward well load 3 and on the opposite end from well load 3 end when lifting well load 3 articulated reciprocating counterweight 1 extending upward from pivot axis tail bearing 18 on extended pitman arm 8 above and not touching the beam 6 is positioned in a frictionless air-arc 22 structurally behind effort 9 and away from fulcrum 7.

FIG. 2 illustrates articulated reciprocating counterweight 1 away from well load 1 and fulcrum 7 when crank arm 4 reaches near horizontal at 90 degrees toward well load 1 to achieve maximum increased counterbalance effect to offset a high torque factor position at substantially 90 degrees while raising the buoyant weight of the sucker rods in fluid plus the weight of the fluid in the well pipe. Then crank arm 4 continues rotating downward and articulated reciprocating counterweight 1 extending upward from pivot axis tail bearing 18 on extended pitman arm 8 above and not touching the beam 6 is positioned in a frictionless air-arc 22 and starts structurally moving back to neutral near the middle of effort 9 arriving when crank arms 4 are straight down at 180 degrees.

Figure 3:
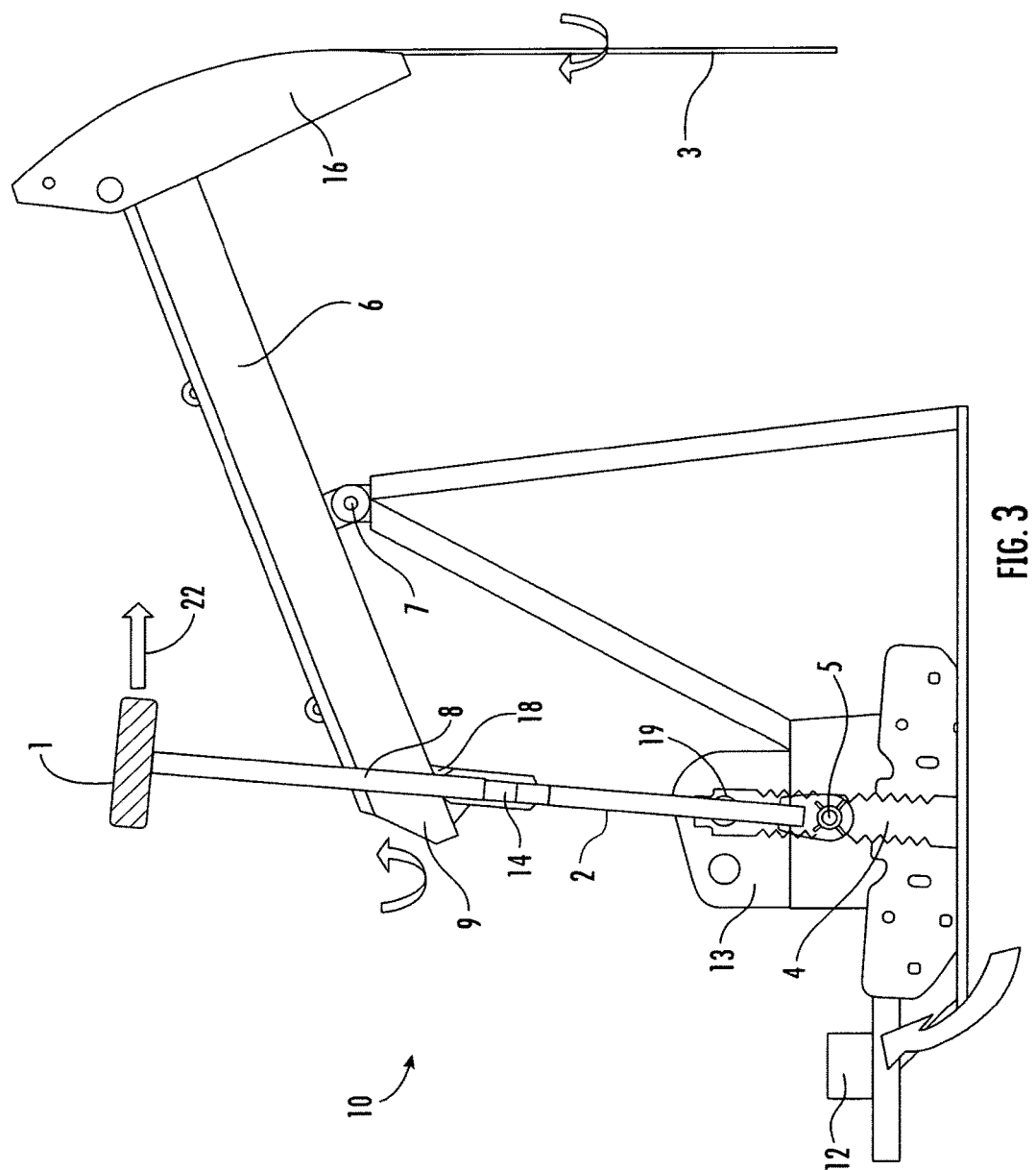
FIG. 3 is a front view of a counterweight assembly according to an embodiment of the present invention wherein the counterweight is positioned neutrally above the lever effort when the crank arm is straight down with the crank rotation toward the well at crank angle 180 degrees and so entering this 180 degree angle with the well load moving upwards but leaving this angle with the well load moving downwards.

FIG. 3 illustrates continuing the cycle when the crank arm 4 is straight down at 180 degrees which is a position of low torque factor and articulated reciprocating counterweight 1 is substantially neutrally positioned above effort 9, the front end or well load 3 end of walking beam 6 is as high as it goes and so will re-start the cycle of reciprocating downward with crank arm 4 rotating clockwise with well load 3 on the right, and at that moment articulated reciprocating counterweight 1 extending upward from pivot axis tail bearing 18 on extended pitman arm 8 above and not touching the beam 6 is positioned in a frictionless air-arc 22 to begins structurally changing position toward fulcrum 7 and well load 3 and away from substantially neutral and is moving to be in front of the effort 9.

Figure 4:
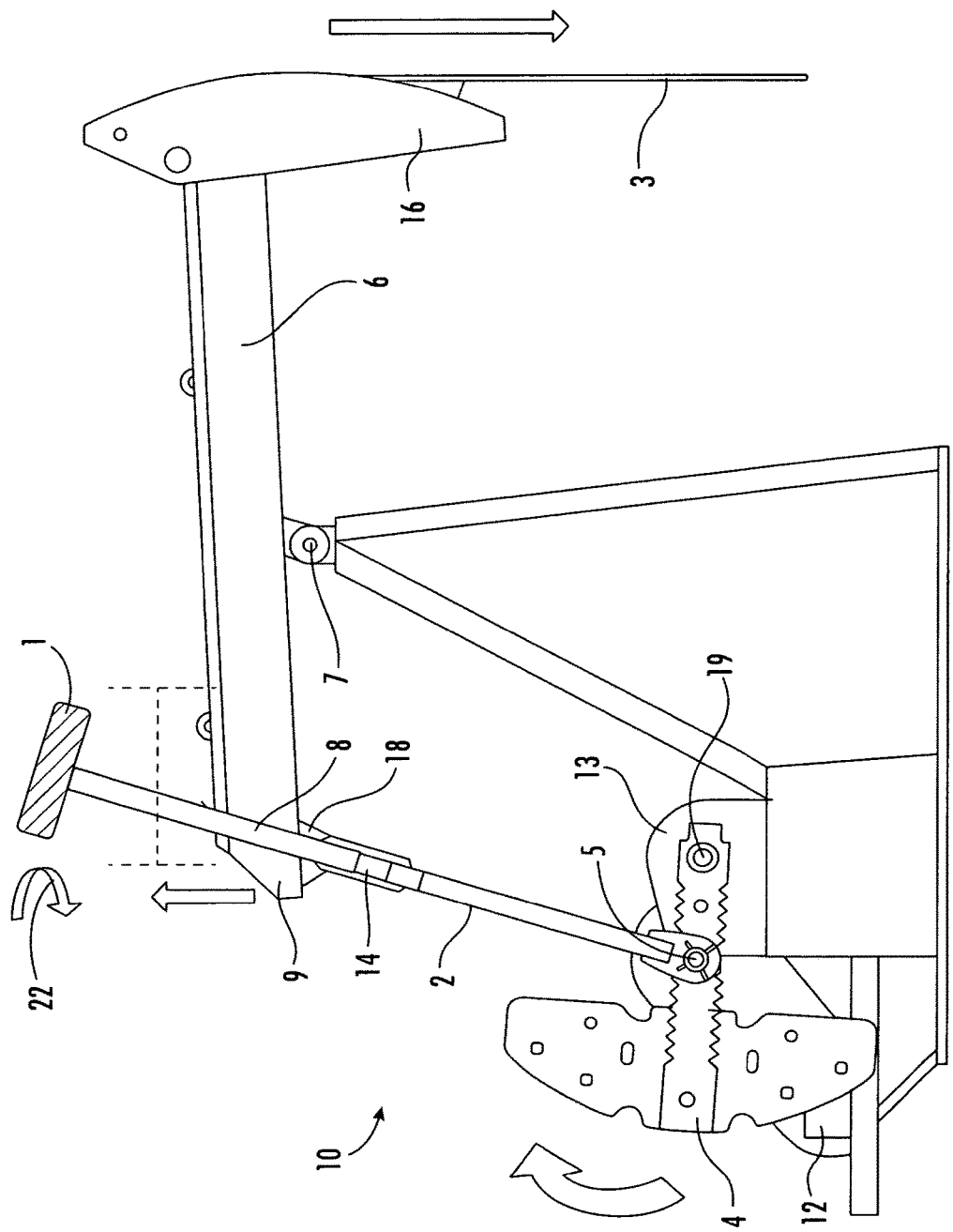
FIG. 4 is a front view of a counterweight assembly according to an embodiment of the present invention wherein the counterweight is positioned to reduce effective counterbalance wherein the counterweight is positioned in front of the lever effort and near the fulcrum when the crank arm is horizontal away from the well with the crank rotation toward the well at crank angle 270 degrees and so entering this 270 degree angle with the well load moving downwards.
Figure 5:
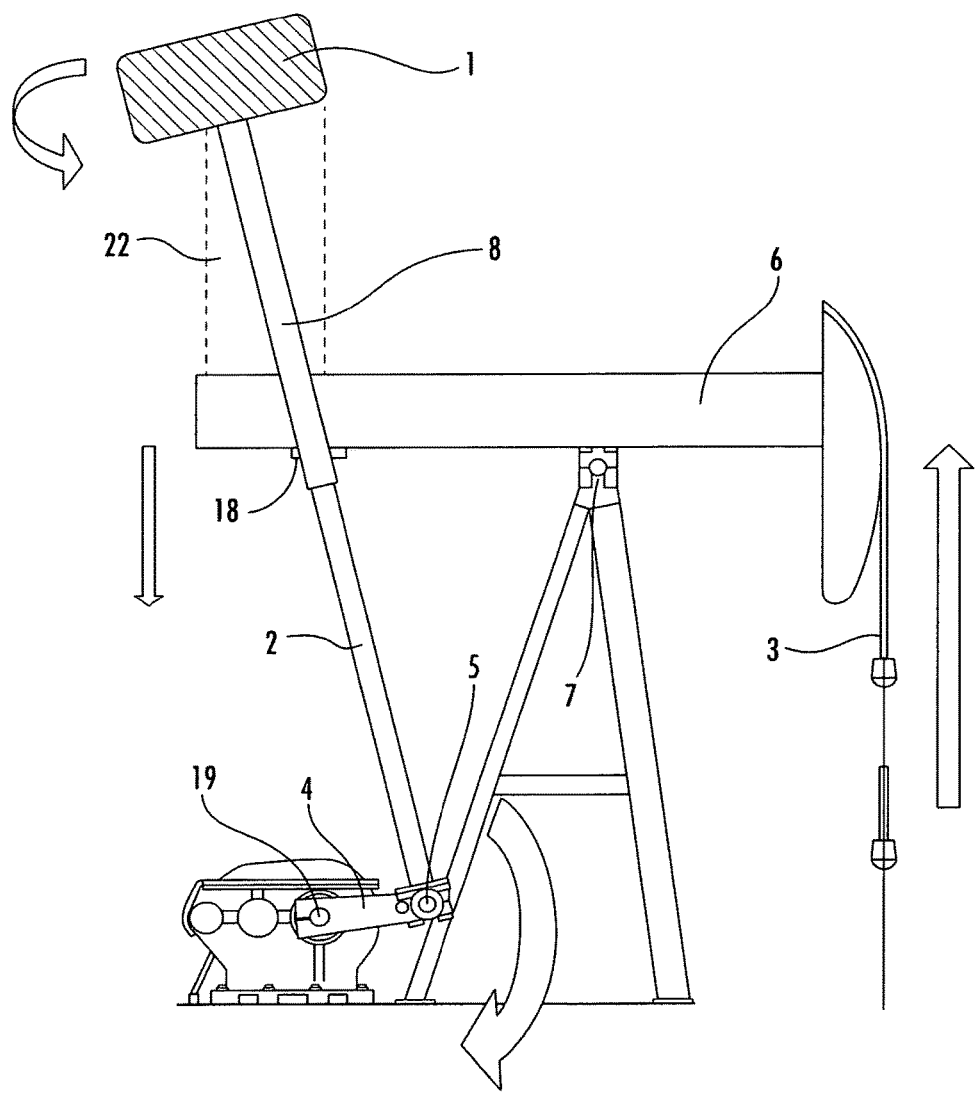
FIG. 5 is a front view of a counterweight assembly according to an embodiment of the present invention wherein the counterweight is positioned on this "beam weighted" unit rotating CW showing extended counterweight position adding effective counterbalance wherein the counterweight is positioned behind the lever effort and away from the fulcrum when the crank arm is horizontal toward the well with the crank rotation toward the well at crank angle 90 degrees and so entering this 90 degree angle with the well load moving upwards.
Figure 6:
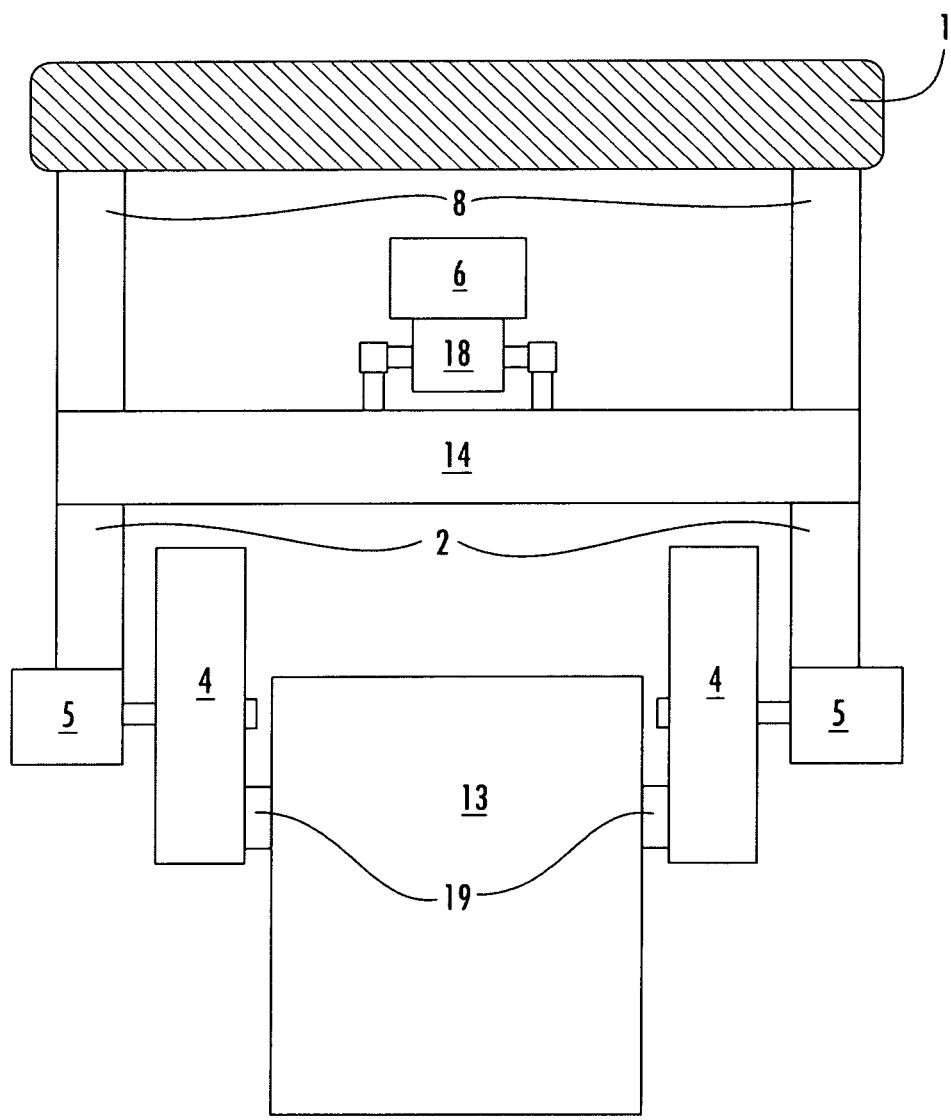
FIG. 6 is a side view of the extended pitman arm assembly with the extended counterweight.
Figure 7:
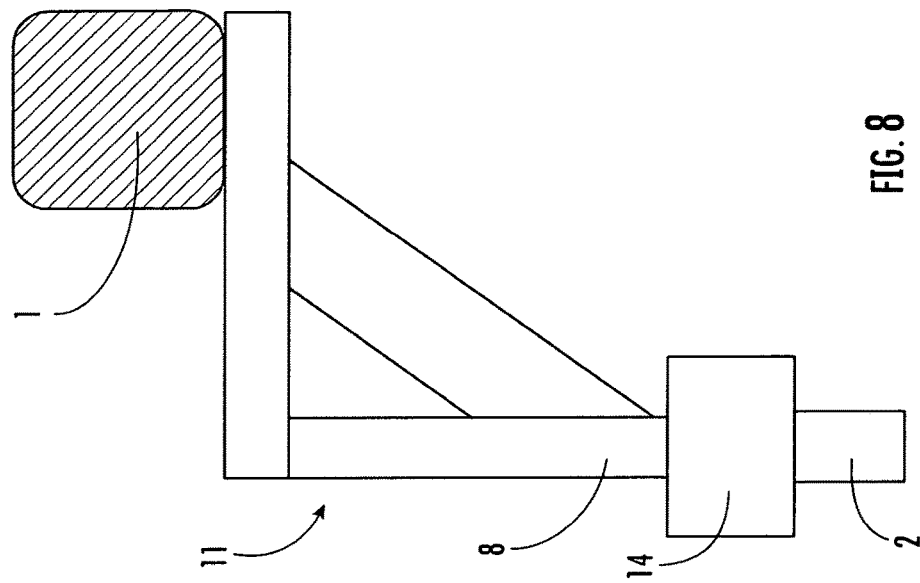
FIG. 7 is a front view of the extended counterweight assembly with an angular extension toward the rear to increase it's effective counterbalance.

FIG. 4 illustrates this device structurally positions articulated reciprocating counterweight 1 nearer well load 3 and fulcrum 7 in front of effort 9 and thus nearer head 16 end of the walking beam 6 to reduce the effective counterweight when lowering only the buoyant weight of the sucker rods in fluid while simultaneously lifting crank arm 4 weight with reduced articulated reciprocating counterweight 1 effective weight at the 270 degree position of high torque factor when crank arm 4 reaches near horizontal at 270 degrees away from well load 1 when lifting counterweight load. Then crank arm 4 continues rotating upward and articulated reciprocating counterweight 1 extending upward from pivot axis tail bearing 18 on extended pitman arm 8 above and not touching the beam 6 is positioned in a frictionless air-arc 22 to starts structurally moving back to substantially neutral position near the middle of effort 9.

For beam counterweighted walking beam 6 pumping units, load prediction calculations are directly proportional to the effective beam counterweight. And calculations for rotary counterweight pumping units can include the API 11E standard equation for calculating net speed reducer 13 torque which is:

θ=Angle of crank arm 4 rotation in a clockwise direction viewed with the wellhead to the right and with zero degrees occurring at 12 o'clock degrees, TF=torque factor for a given crank angle (from manufacturer's tables or computed from geometric measurements), B=structural unbalance (from manufacturer or measured), Tn=Net torque, inch-pounds, at the crankshaft for a given crank angle θ, W=polished rod load at any specific crank angle θ, M=maximum moment of the rotary counterweights (from manufacturer or computed from measurements), With these input values Tn=net torque are computed.

Where TN=TF($W$-$B$)-$M$ SIN θ

The rotational motion of crank arm 4 and crank wrist pin 5 about the crankshaft 19 of the speed reducer 13 driven by the prime mover 12 causes a maximum moment of rotary crank arm 4 weight, whose standard nomenclature is written in thousands of inch-pounds. That maximum moment is nominally the position of the maximum effective crank arm 4 counterbalance at a little less than 90 degrees and a little less than 270 degrees. 90 degrees and 270 degrees is nominally the position of maximum net torque and maximum requirement for counterbalance effect. So when the articulated reciprocating counterweight 1 moves away from well load 3 and fulcrum 7 it is increasing the counterbalance effect to compensate and offset the maximum net torque requirement in the front horizontal crank arm 4 position to raise the unbalanced well load 3. And vice versa, when mechanically positioned to be nearer well load 1 and fulcrum 7 and raising crank arm 4 weight at effort 9 it is decreasing the counterbalance effect to compensate and offset the maximum net torque required in the rear horizontal crank arm 4 position to lower the unbalanced well load 3.

The size and weight of articulated reciprocating counterweight 1 used can be bigger or smaller and so heavier or lighter depending on suiting the particular well load 3 parameters; and also auxiliary slabs of weight can be added or subtracted as desired. In this teaching the length of the extended pitman arm 8 assembly can be longer or shorter to suit the particular well load 3 parameters, a longer length giving more effect.

With this teaching walking beam 6 reciprocates the well load 3 with reduced net torque as the result of geometric positioning in a frictionless air-arc 22, without losing efficiency through friction by sliding a weight on the beam 6 uphill, without needing to use auxiliary power on a pumping unit 10 weighted with articulated reciprocating counterweight 1 extending upward from pivot axis tail bearing 18 on extended pitman arm 8 above and not touching the beam 6 in a frictionless air-arc 22 and with pitman arm extension 8 sized long enough and articulated reciprocating counterweight 1 sized heavy enough such that when moved to the position near well load 3 and-fulcrum 7 and thus crank arm 4 is horizontal to the back while lowering the buoyant weight of the rods in fluid, and also with articulated reciprocating counterweight 1 positioned away from well load 3 and fulcrum 7 when crank arm 4 is horizontal frontward when raising the buoyant weight of the rods in fluid plus the weight of the fluid.

Figure 8:
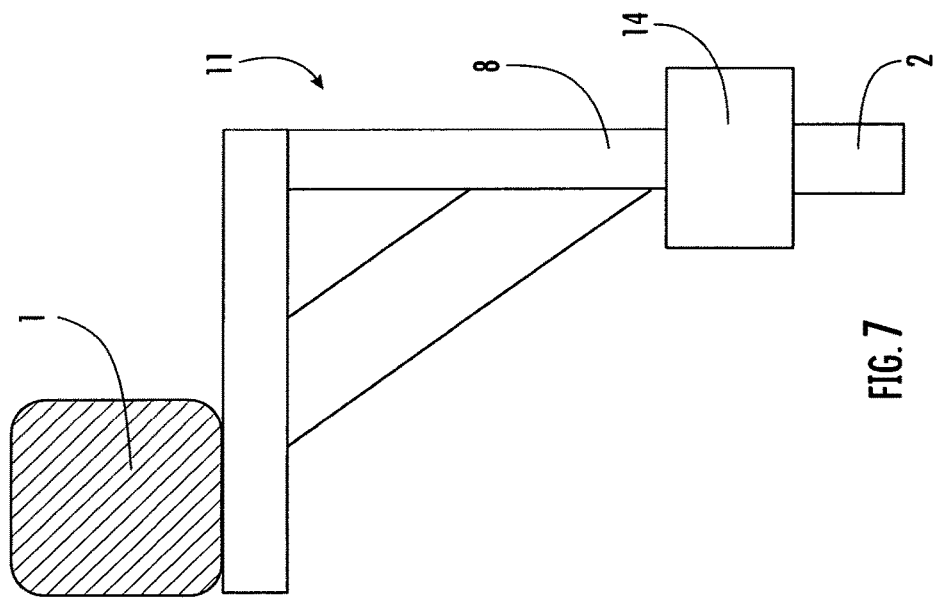
FIG. 8 is a front view of the extended counterweight assembly with an angular extension toward the front to reduce it's effective counterbalance.

FIG. 8 illustrates an embodiment of extended counterweight 1 alternately fashioned to be off center with effort 9 by connection to angular extension assembly 11 in back of effort 9 to increase the effect of the articulated reciprocating counterweight 1 extending upward from pivot axis tail bearing 18 on extended pitman arm 8 above and not touching the beam 6 swaying in a frictionless air-arc 22.

Figure 9:
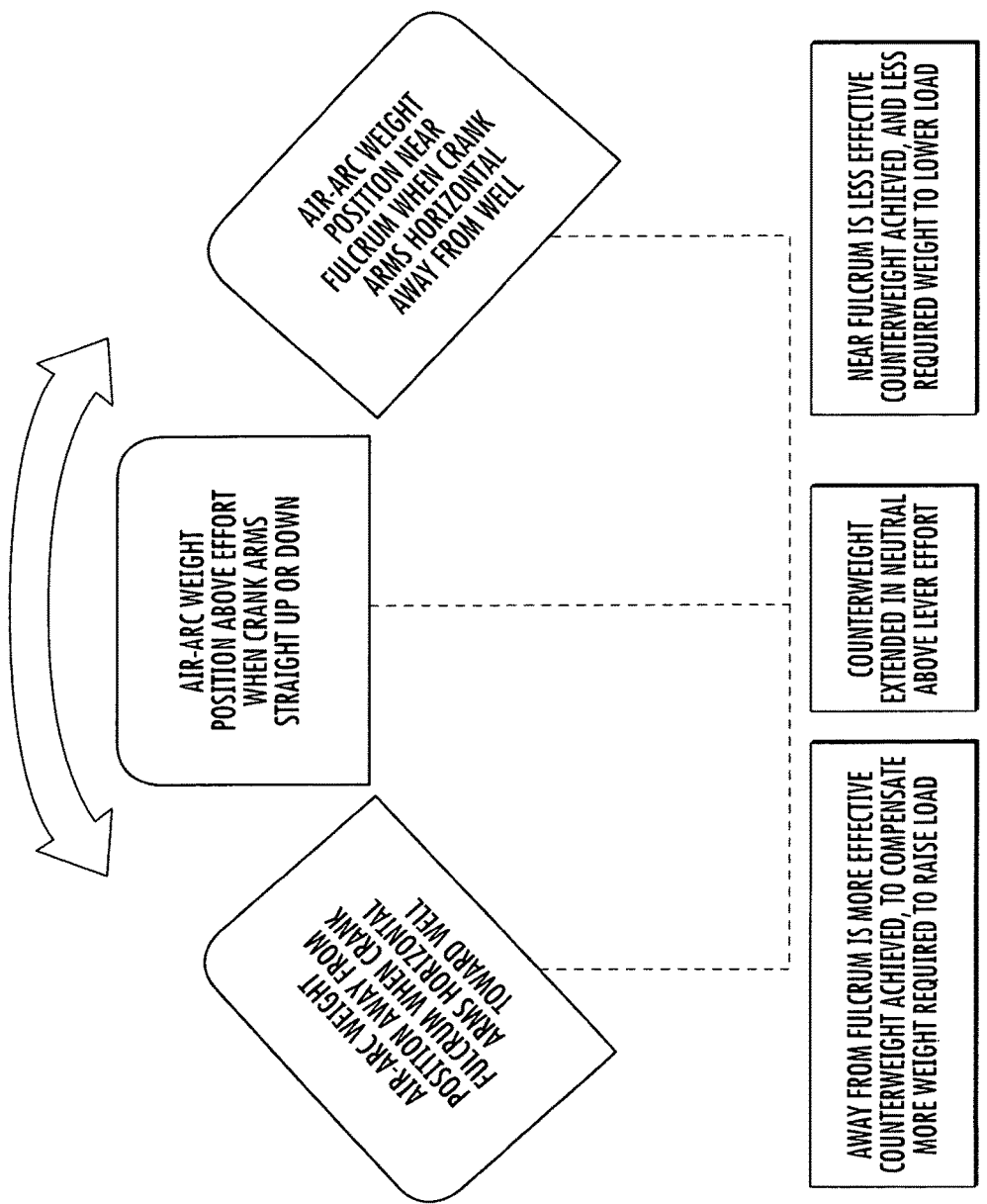
FIG. 9 is a chart showing relative extended counterweight positions away from the fulcrum, neutrally above the effort, and near the fulcrum.

FIG. 9 illustrates an embodiment of extended counterweight 1 alternately fashioned to be off center with effort 9 by connection to angular extension 11 in front of the effort thereby reducing effect of articulated reciprocating counterweight 1 extending upward from pivot axis tail bearing 18 on extended pitman arm 8 above and not touching the beam 6 swaying in a frictionless air-arc 22.

Some described and illustrated embodiments of the invention can take advantage of the natural force of gravity to advance the timing of effective weight placement of moveable reciprocating counterweight 17 in or on a frame 21 or fluid filled reciprocating counterweight 15 in a shell 20 and thus enhance the phased weight distribution effect of extended counterweight 1, thereby further smoothing out the torque curve.

Figure 10:
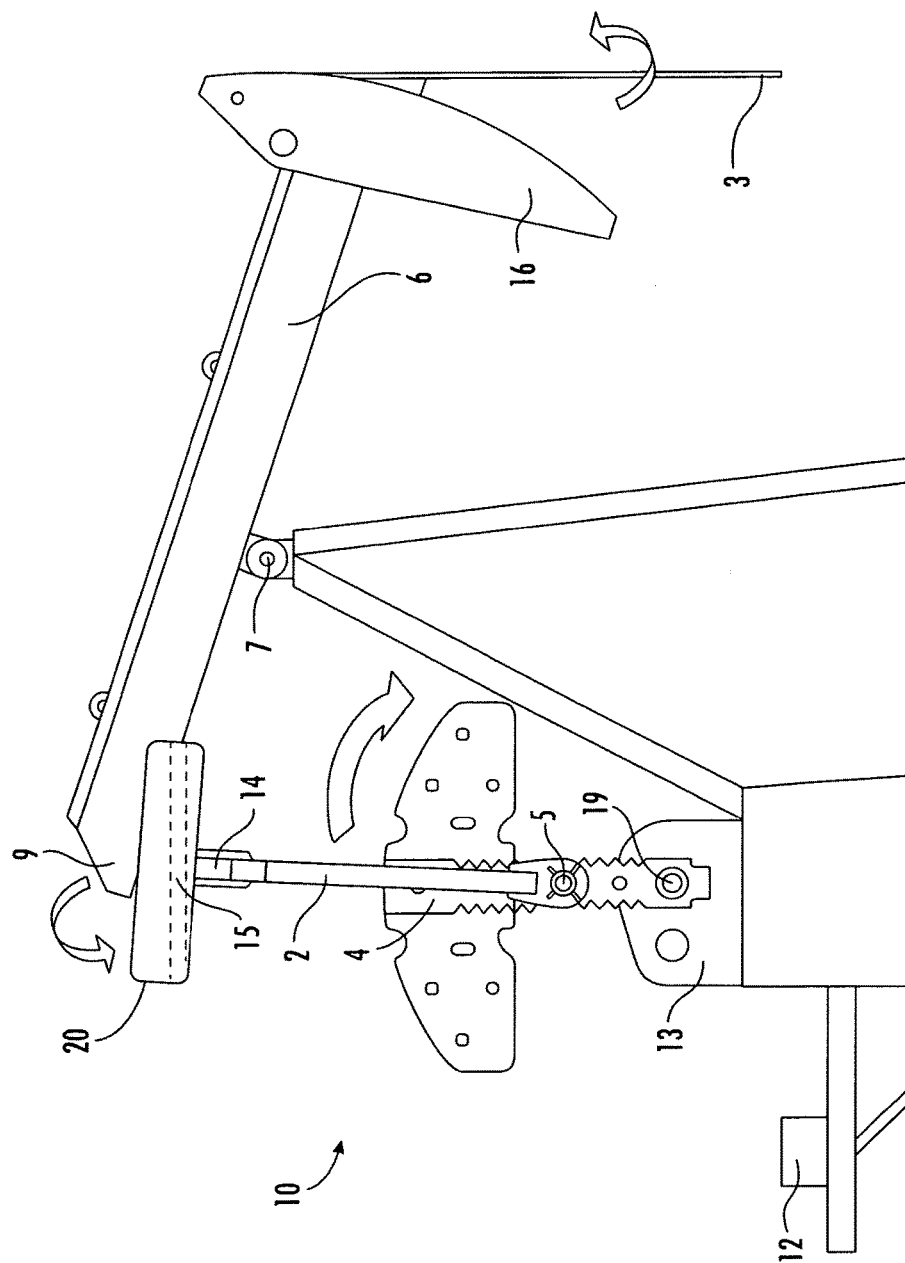
FIG. 10 is a front view of a fluid filled counterweight assembly according to an embodiment of the present invention wherein the fluid filled counterweight is neutrally positioned above the lever effort when the crank arm is straight up and with the crank rotation toward the well at crank angle 0 degrees; and so entering this 0 degree angle with the well load moving downwards but leaving this 0 degree angle with the well load movement upwards.
Figure 11:
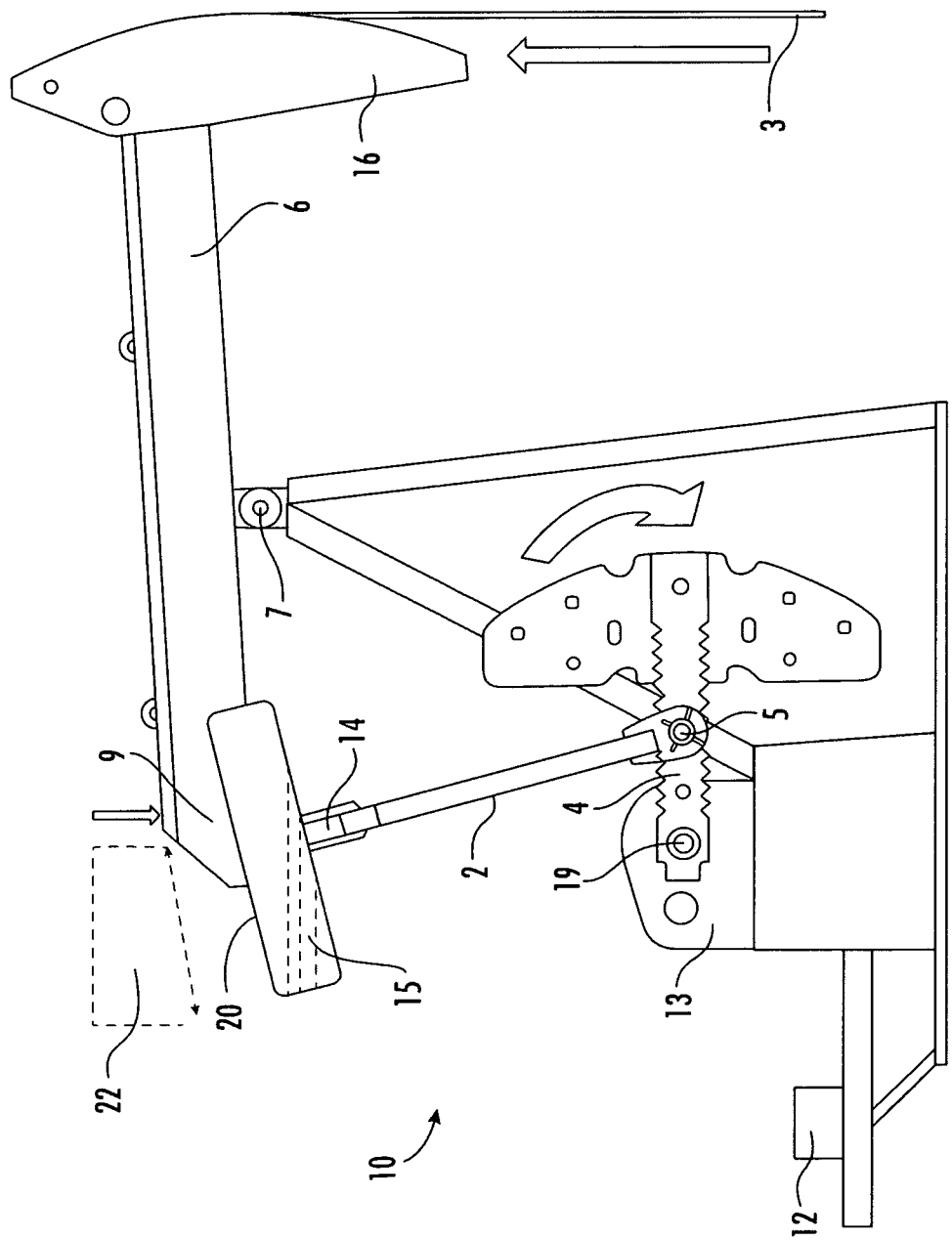
FIG. 11 is a front view of a fluid filled counterweight assembly according to an embodiment of the present invention wherein the fluid filled counterweight is positioned behind the lever effort and away from the fulcrum when the crank arm is horizontal toward the well with the crank rotation toward the well at crank angle 90 degrees and so entering this 90 degree angle with the well load moving upwards requiring more effective counterweight.
Figure 12:
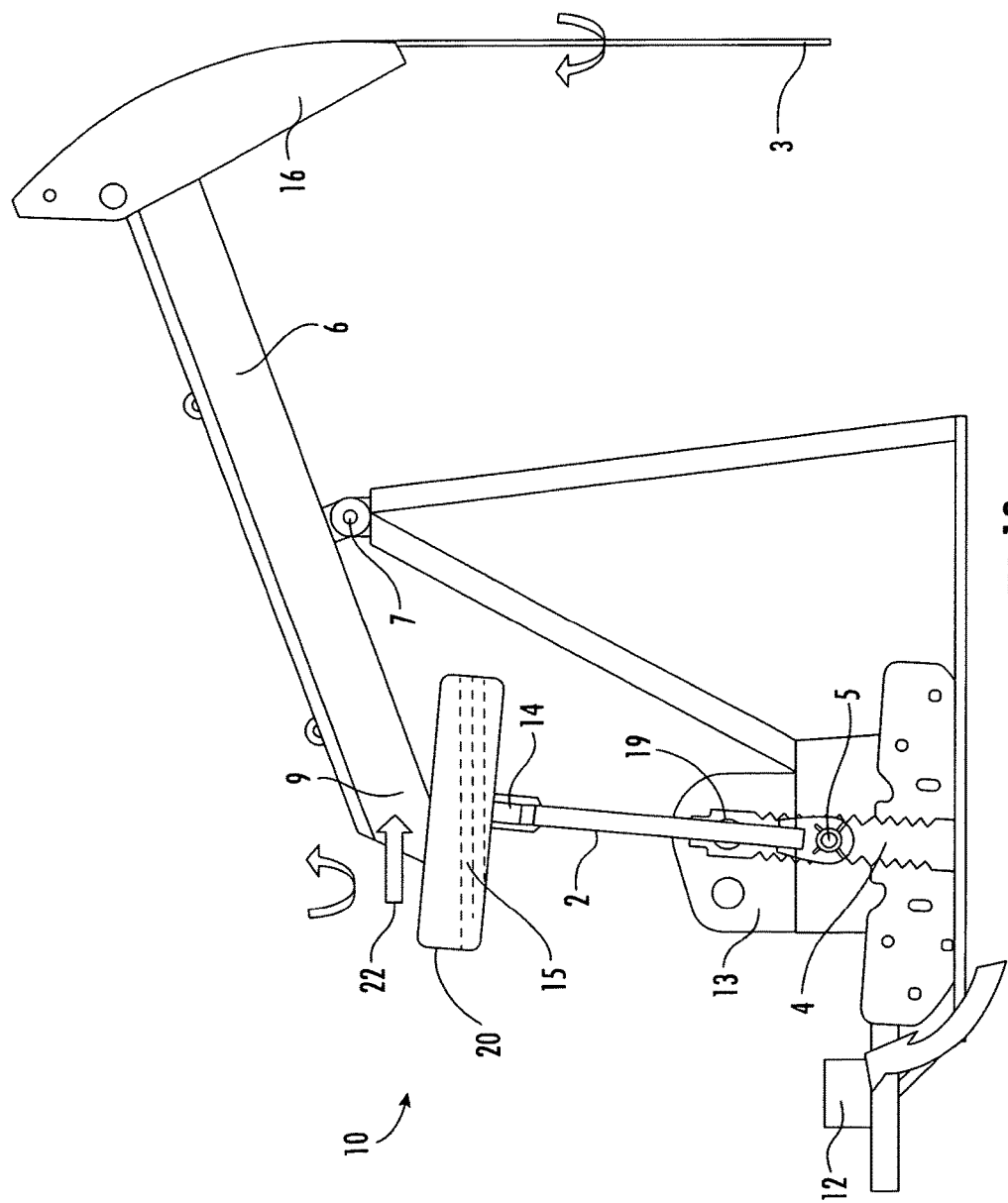
FIG. 12 is a front view of a fluid filled counterweight assembly according to an embodiment of the present invention wherein the fluid filled counterweight is positioned neutrally above the lever effort when the crank arm is straight down with the crank rotation toward the well at crank angle 180 degrees and so entering this 180 degree angle with the well load moving upwards but leaving this angle with the well load moving downwards.
Figure 13:
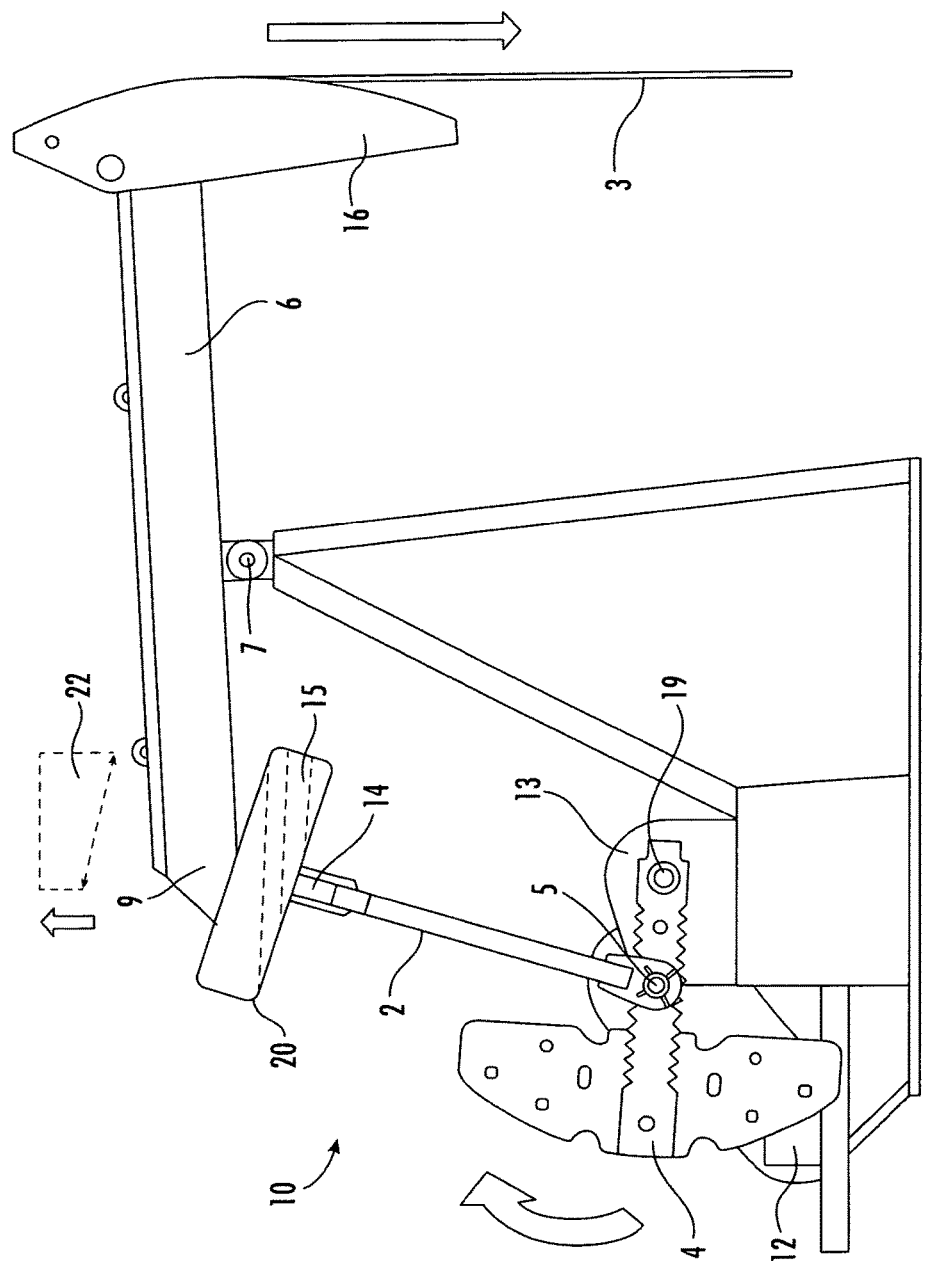
FIG. 13 is a front view of a fluid filled counterweight assembly according to an embodiment of the present invention wherein the fluid filled counterweight is positioned in front of the lever effort and near the fulcrum when the crank arm is horizontal away from the well with the crank rotation toward the well at crank angle 270 degrees and so entering this 270 degree angle with the well load moving downwards requiring less effective counterweight.
Figure 14:
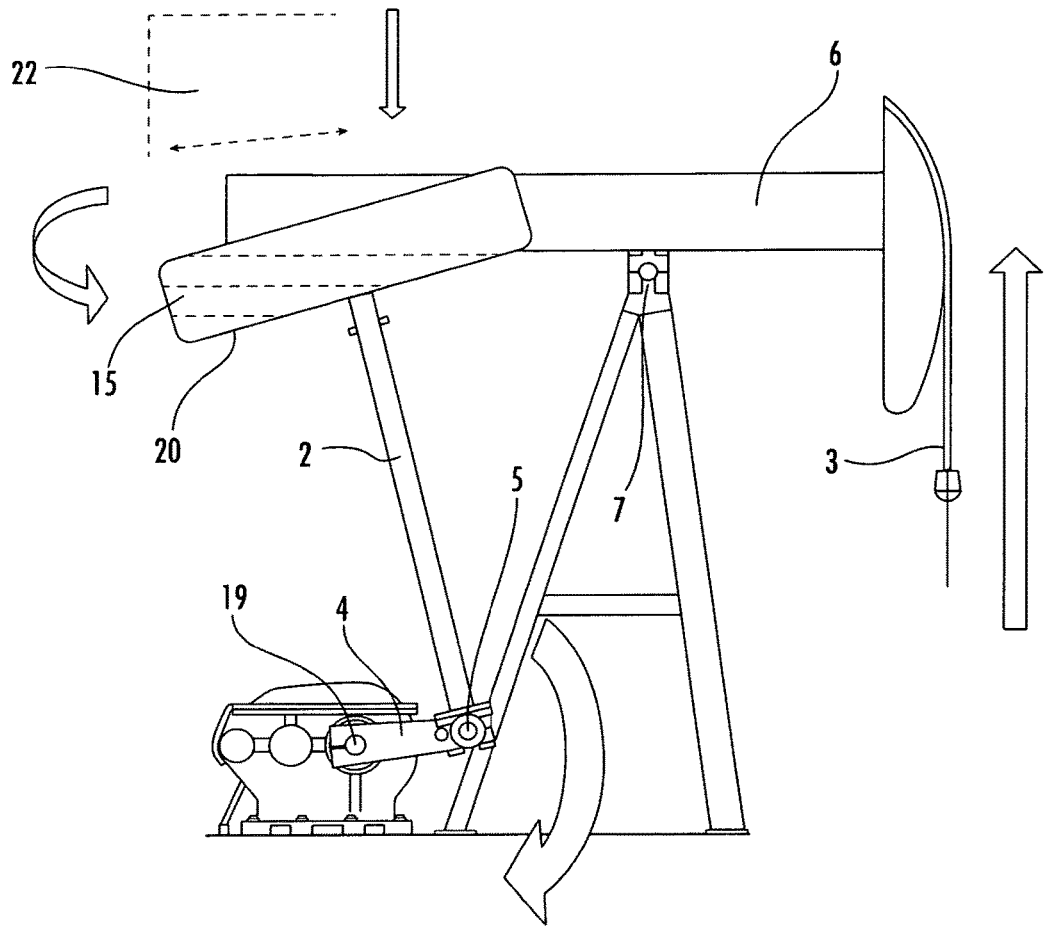
FIG. 14 is a front view of a fluid filled counterweight assembly according to an embodiment of the present invention wherein the counterweight is positioned on this "beam weighted" unit rotating CW showing extended counterweight position adding effective counterbalance wherein the counterweight is positioned behind the lever effort and away from the fulcrum when the crank arm is horizontal toward the well with the crank rotation toward the well at crank angle 90 degrees and so entering this 90 degree angle with the well load moving upwards.
Figure 16:
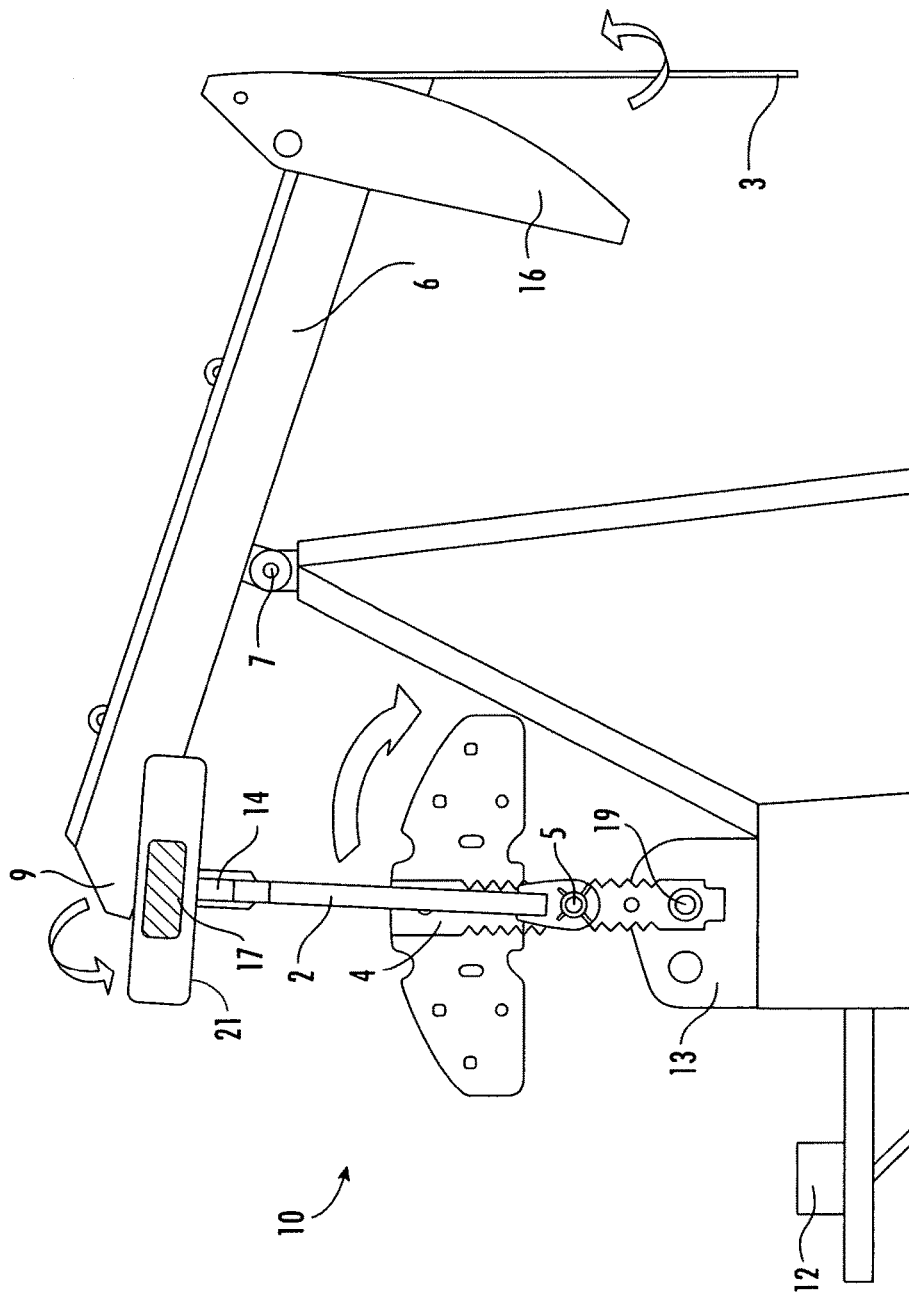
FIG. 16 is a front view of a moveable counterweight assembly according to an embodiment of the present invention wherein the counterweight is positioned neutrally above the lever effort when the crank arm is straight up with the crank rotation toward the well at crank angle 0 degrees and so entering this 0 degree angle with the well load moving downwards but leaving this angle with the well load movement upwards.
Figure 17:
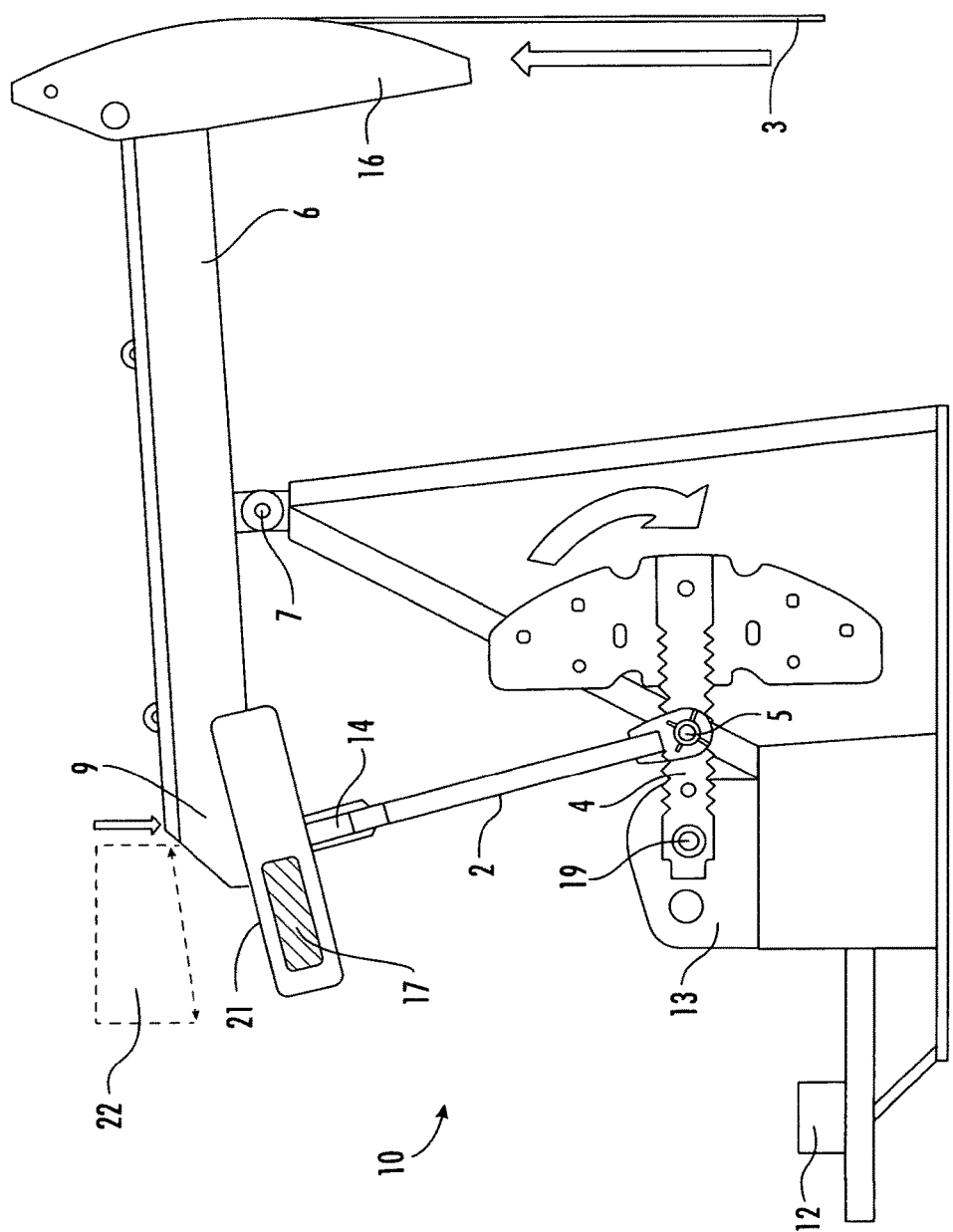
FIG. 17 is a front view of a moveable counterweight assembly according to an embodiment of the present invention wherein the counterweight is positioned to add effective counterbalance wherein the counterweight is behind the lever effort and away from the fulcrum when the crank arm is horizontal toward the well with the crank rotation toward the well at crank angle 90 degrees and so entering this 90 degree angle with the well load moving upwards.
Figure 18:
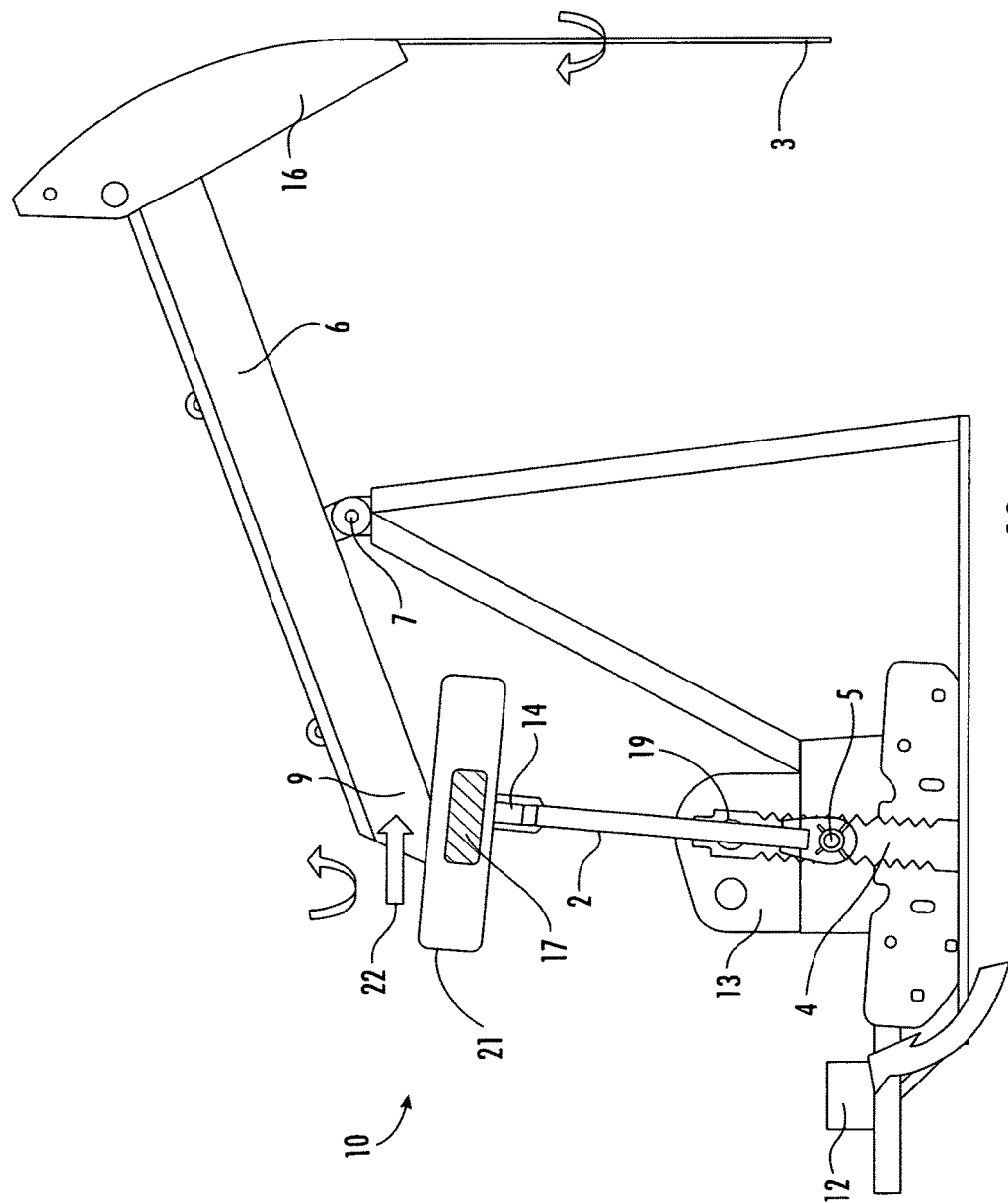
FIG. 18 is a front view of a moveable counterweight assembly according to an embodiment of the present invention wherein the counterweight is positioned neutrally above the lever effort when the crank arm is straight down with the crank rotation toward the well at crank angle 180 degrees and so entering this 180 degree angle with the well load moving upwards but leaving this angle with the well load moving downwards.
Figure 19:
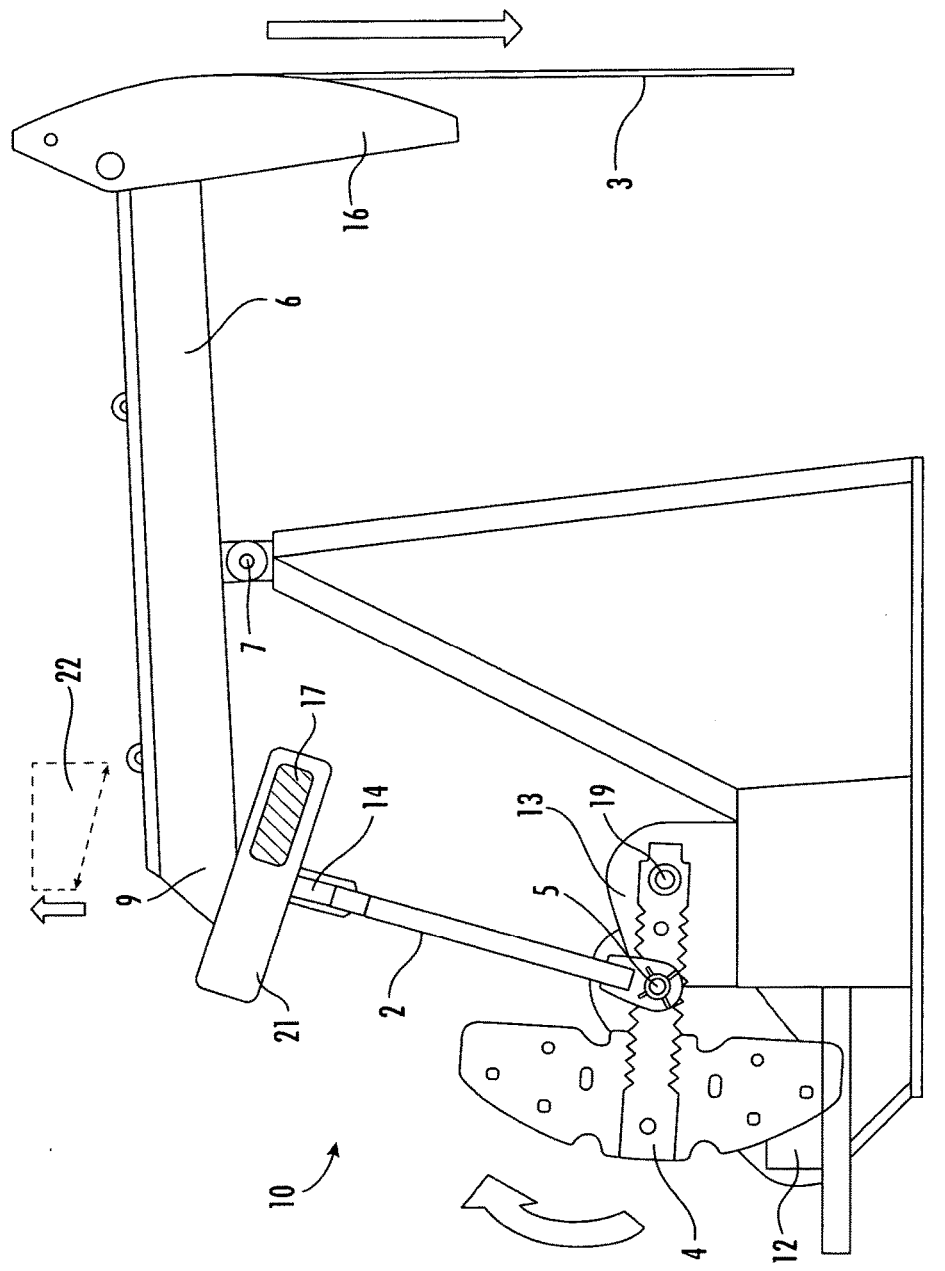
FIG. 19 is a front view of a moveable counterweight assembly according to an embodiment of the present invention wherein the counterweight is positioned to reduce effective counterbalance wherein the counterweight is positioned in front of the lever effort and near the fulcrum when the crank arm is horizontal away from the well with the crank rotation toward the well at crank angle 270 degrees and so entering this 270 degree angle with the well load moving downwards.
Figure 20:
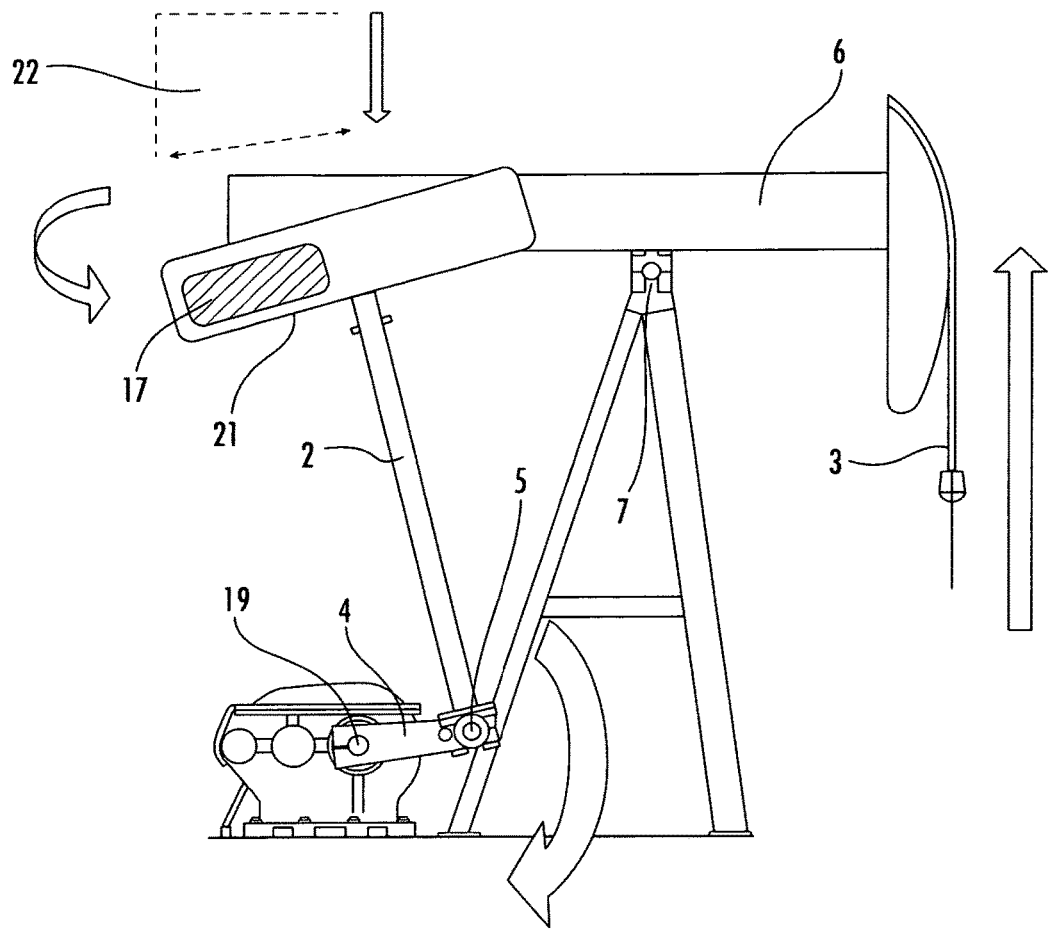
FIG. 20 is a front view of a moveable counterweight assembly according to an embodiment of the present invention wherein the counterweight is positioned on this "beam weighted" unit rotating CW showing extended counterweight position adding effective counterbalance wherein the counterweight is positioned behind the lever effort and away from the fulcrum when the crank arm is horizontal toward the well with the crank rotation toward the well at crank angle 90 degrees and so entering this 90 degree angle with the well load moving upwards.

FIG. 10 fluid filled reciprocating counterweight 15 and FIG. 16 moveable reciprocating counterweight 17 allows the force of gravity to slide or move the counterbalance effect to positions either in front of effort 9 or behind effort 9 at the optimum beneficial moment to increase and more efficiently use the counterbalance effect with the same amount of dead weight positioned more efficiently than rigidly positioned counterweight. Thus the natural force of gravity itself without needing auxiliary power efficiently improves the phased counterbalance effect with additional beneficial positioning weight transfer with articulated reciprocating counterweight 1 extending upward from pivot axis tail bearing 18 on extended pitman arm 8 above and not touching the beam 6 swaying in a frictionless air-arc 22.

Figure 15:
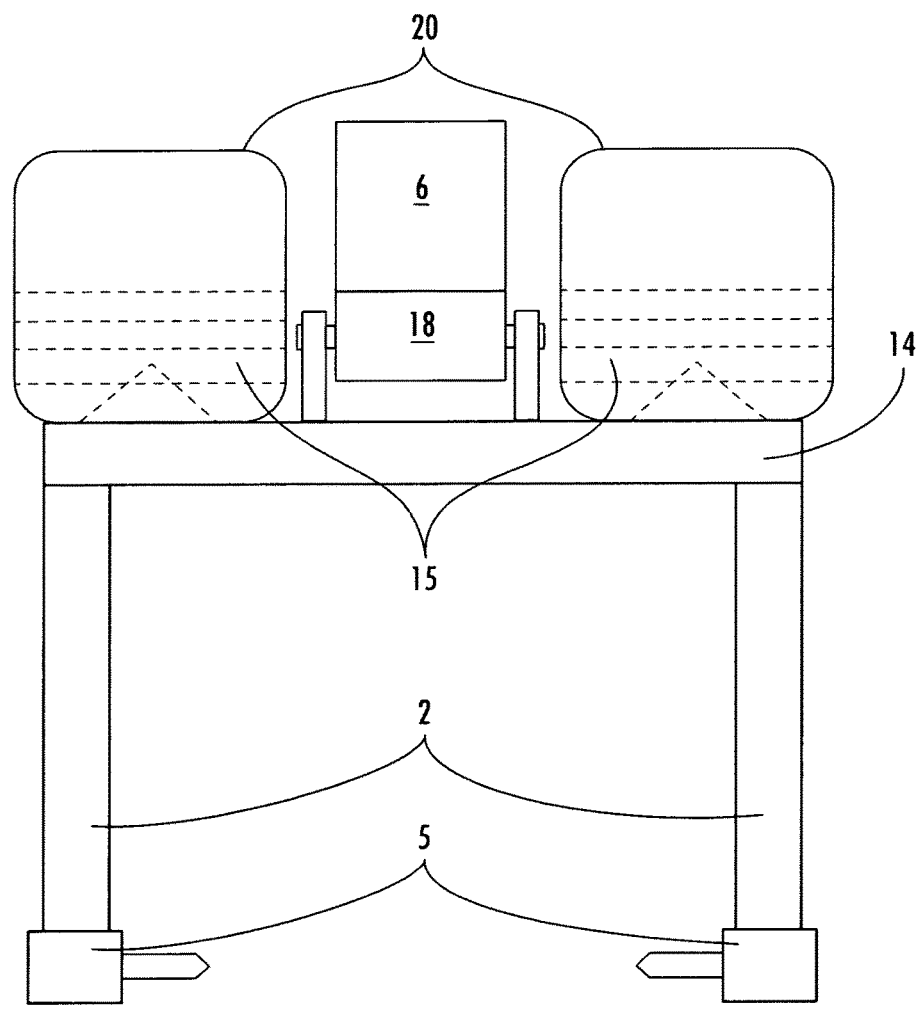
FIG. 15 is a side view of the extended fluid filled pitman arm assembly with the fluid filled counterweight.

FIG. 15 illustrates fluid filled reciprocating counterweight 15 assembly with fluid baffles to cushion, dampen, and absorb shock when reversing direction. Allowing the natural force of gravity to move a sufficiently dense fluid such as mercury to provides more weight to than can be in the same amount of space as steel with articulated reciprocating counterweight 1 extending upward from pivot axis tail bearing 18 on extended pitman arm 8 above and not touching the beam 6 swaying in a frictionless air-arc 22.

FIG. 16 illustrates the moveable reciprocating counterweight 17 assembly. Moveable reciprocating counterweight 17 assembly has one or more braking mechanism, recoil spring, bumper, cushion, dampener, or shock absorber to facilitate reversing the direction.

Because with these moving weight embodiments the center of weight changes location they require additional structural strength in design and fabrication for stress and strain than the rigid stationary weight embodiments.

Articulated reciprocating counterweight 1 can be retrofitted and installed on already existing units on the existing well installations by using attaching methods such as but not limited to bolts, rivets, weld, and other suitable methods to connect articulated reciprocating counterweight 1 assembly to the pre-existing pitman arm 2 or to the equalizer cross beam 14 to make extended pitman arm 8 assembly rise above the pivot-axis at the tail bearing 18 to position the articulated reciprocating counterweight 1 extending upward from pivot axis tail bearing 18 on extended pitman arm 8 above and not touching the beam 6 to sway in a frictionless air-arc 22.

And the articulated reciprocating counterweight 1 is also desirable to be incorporated as described above in original equipment manufacturing, OEM, on newly manufactured walking beam 6 pumping units 10. Both retrofitted and OEM can employ user discretionary extension length of extended pitman arm and amount of counter weight to fit the particular specific operational design parameters of desired effective counterweight.

Both retrofitted and OEM walking beam 6 pumping units 10 utilizing this invention can allow for longer beam pump stroke lengths and smaller torque capacity speed reducers 13 than those of current practice in known systems because of the increased efficiency with articulated reciprocating counterweight 1 positioned in an air-arc effectively reducing the required lifting and lowering net torque.

And also with those longer strokes walking beam 6 pump can operate at slower strokes per minute, and also allow the use of reduced prime mover 12 horsepower, so new pumping unit 10 designs will want to accommodate the benefits of this invention, where:

Load×Distance from tipping point=Counterweight Mass×Distance from tipping point and is called load moment.

Current practice ECB (effective counterbalance) ~Bouyant weight of rods+½ fluid load on pump plunger.

Lowest speed reducer 13 torque loads on walking beam 6 pumping units 10 occur at top and bottom of stroke, 0 degrees and 180 degrees, because of low torque factor from unit geometry. And nominal peak speed reducer torque loads occur at high torque factor at about 90 degrees and about 270 degree crank arm 4 angles which values are desired to be equal when the walking beam 6 pump is balanced in the field at the well using current practice in known systems without the benefit of this invention. With this invention utilizing sufficiently long extend pitman arms 8 and sufficiently heavy articulated reciprocating counterweight 1 it is even possible to achieve negative torque at about 90 degrees and about 270 degree crank arm 4 angles.

Negative torque caused by deliberate unbalance is electrically regenerative and some negative unbalance may occur when reducing torque, but some types of excessive negative unbalance can reach diminishing benefits so the recommended control parameters will limit some types negative torque. Subsequent operating manuals can address details of these and other operational aspects, where:

Net torque (Tn)=9.53×kilowatt (kw)×efficiency (eff)/ strokes per minute (SPM)×speed variation of power transmission (SV).

Torque factor (TF) is used to convert polished rod load to torque (Nm).

Torque due to net well load (TWN)=torque factor (TF)×well load (WN).

Net well load (WN)=well load ($W$)−unit unbalance (SU).

The foregoing embodiments have been presented for the purposes of illustration and description. They are not intended to be exhaustive or to limit the invention and method of use to the precise forms disclosed. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A lever effort assistive device for correcting an unbalanced load on a counterweighted, crank-driven reciprocating motion lever having a fulcrum, comprising:
   a lever;
   a lever effort extension-member comprising a pitman arm extending above the lever the pitman arm having an upper end attached at a counterweight, swaying in an air-arc above the lever, and a lower end pivoting at a lever effort tail bearing, wherein the lower end pivoting at the lever effort tail bearing is attached as a pivoting extension of the lever effort at the lever, wherein the counterweight is attached so that it sways in the air-arc above the upper end of the lever effort extension member via a pivoting extended pitman arm,
   wherein the counterweight is mechanically positioned so that it alternately sways in the air-arc away from the lever fulcrum and toward the lever fulcrum during opposite lever rotation directions.

2. The lever effort assistive device for correcting as the unbalanced load of claim 1,
   wherein said counterweight is configured to sway in the air-arc on the extended pitman arm extended above the lever, articulated by a lever pivot-axis of the lever between in front of the lever effort to behind the lever effort,
   wherein said counterweight is articulated by the lever pivot-axis; and
   wherein the pitman arm acts as a secondary lever thereby swaying the counterweight to and fro in the air arc, between near to the fulcrum and the load and thus in front of the lever effort, to away from the fulcrum and the load behind the lever effort.

3. The lever effort assistive device for correcting an unbalanced load of claim 2, wherein the lever and the pitman arm acting as a secondary lever are class 1 levers for a reciprocating down hole pumping unit.

4. A torque-reducing effort assistive counterbalance device for a beam pumping unit having a pivot axis and a pitman arm extending a sufficient distance above a beam at a lever effort of the beam to sway in an air-arc to affect counterweight effect, comprising:
   an extended pitman arm having a counterweight fixed at one end and the pitman arm fixed at one end, wherein the extended pitman arm is attached as an extension of the pitman arm, and
   wherein the counterweight is mechanically positioned in the air-arc alternately away from behind a beam pumping unit pivot axis to in front of the beam pumping unit pivot axis.

5. The torque-reducing effort assistive counterbalance device for a beam pumping unit of claim 4, wherein,
   the extended pitman arm is articulated extended above the lever effort of the beam so that the counterweight is reciprocatingly articulated, wherein the extended pitman arm is articulated by the beam pumping unit pivot axis acting as a secondary lever swaying the counterweight to and fro in the air-arc;
   wherein the extended pitman arm is further articulated by the beam pumping unit pivot axis to sway the articulated reciprocating counterweight nearer to a fulcrum of the beam and a load of the beam in the air-arc, wherein the articulated reciprocating counterweight is thereby disposed in front of the lever effort of the beam thereby decreasing effective counterbalance; and the extended pitman arm is articulated by the beam pumping unit pivot axis to sway the articulated reciprocating counterweight away from the fulcrum of the beam and the load of the beam in the air-arc, wherein the articulated reciprocating counterweight is thereby disposed behind the lever effort of the beam thereby increasing effective counterbalance.

6. The torque-reducing effort assistive counterbalance device for a beam pumping unit of claim 4 further comprising:
   crank arms each having a rotational direction from top to bottom such that falling motion is towards a well load thereby swaying the counterweight in the air-arc away from a fulcrum of the beam and the well load on the pitman arm extended above the beam;
   and wherein the crank arms each have a rotational direction from bottom to top such that upward motion is away from the well load thereby swaying the counterweight in the air-arc nearer to the fulcrum of the beam and well load on the pitman arm extended above the beam; and
   wherein the counterweight is disposed in the air-arc such that a reduced net torque actuates the beam to lift and lower an unbalanced load.

7. The torque-reducing effort assistive counterbalance device for a beam pumping unit of claim 6 wherein
   the counterweight is connected to the extended pitman arm which is thereby contiguously connected to the pitman arm and extends in the air above the lever effort of the beam; and
   the pitman arm pivotably connects to a crank wrist pin, articulated with the crank arms, rotating around a crank shaft.

8. The torque-reducing effort assistive counterbalance device for a beam pumping unit of claim 4 wherein said counterweight sways in an air-arc on the beam pumping unit pivot axis to and fro from in front of and to behind the lever effort of the beam such that net torque is reduced when:
   the counterweight sways in the air-arc on the beam pumping unit pivot axis near the fulcrum of the beam and a well load, thereby being positioned in front of the lever effort of the beam and decreasing the effective counterbalance; and
   the counterweight sways in the air-arc on the beam pumping unit pivot axis away from the fulcrum of the beam and the well load thereby being positioned behind the lever effort of the beam and increasing the effective counterbalance.

9. The torque-reducing effort assistive counterbalance device for a beam pumping unit of claim 6 wherein the position of said counterweight swaying in the air-arc on the beam pumping unit pivot axis has a substantially neutral weight effect when disposed on the pitman arm extended above the beam at the lever effort of the beam when the crank arms are substantially vertical.

10. The torque-reducing effort assistive counterbalance device for a beam pumping unit of claim 4 wherein:
   when the extended pitman arm disposes the counterweight in the air above the beam and the beam pumping unit pivot axis and near to the fulcrum of the beam and well load and thus in front of the lever effort of the beam and the beam pumping unit pivot axis when a crank arm is horizontally away from a well, then a weight effect is substantially and efficiently minimum; and
   when the extended pitman arm disposes the counterweight in the air above the beam and the beam pumping unit pivot axis and away from the fulcrum of the beam and well load and thus behind the lever effort of the beam and the beam pumping unit pivot axis when the crank arm is horizontally towards the well, then the weight effect is substantially and efficiently maximum.

11. The torque-reducing effort assistive counterbalance device for a beam pumping unit of claim 4 wherein:
   the counterweight is a fluid filled reservoir that equalizes fluid, wherein a force of gravity re-positions the fluid in the reservoir to equalize to and fro as swaying in the air-arc changes angular displacement of the fluid filled articulated reciprocating counterweight from:
      a position with angular displacement tilted near to the fulcrum of the beam and well load in front of the lever effort of the beam; and
      a position with angular displacement tilted away from the fulcrum of the beam and well load and behind the lever effort of the beam.

12. The torque-reducing effort assistive counterbalance device for a beam pumping unit of claim 11 wherein the fluid in the fluid filled reservoir is comprised of a sufficiently dense fluid such as mercury.

13. The torque-reducing effort assistive counterbalance device for a beam pumping unit of claim 4 wherein said counterweight swaying in the air-arc is comprised of a solid material sufficiently dense to affect counterweight effect such as steel.

14. The torque-reducing effort assistive counterbalance device for a beam pumping unit of claim 4 wherein said counterweight swaying in the air-arc is comprised of a plurality of removable weights.

15. The torque-reducing effort assistive counterbalance device for a beam pumping unit of claim 4 wherein a moveable counterweight mass within the counterweight resides encased in a shell extending sufficient distance above the beam at the lever effort of the beam to sway in the air-arc to affect the counterweight effect whose angular displacement changes by articulated swaying motion whereby the motive force of gravity effects movement of the counterweight mass to and fro internally within the shell thereby magnifying a weight transfer of the weight filled shell itself and thus increasing the torque reducing effect, wherein the force of gravity repositions the moveable counterweight mass to achieve an increasing dynamic counterbalance effect as angular displacement of the shell is articulated in air to and fro;
   wherein the torque reducing effect is maintained by reduced effective counterbalance weight while the moveable counterweight mass is disposed near to the fulcrum of the beam and well load in front of the lever effort of the beam; and
   the torque reducing effect is maintained by increased effective counterbalance weight while the moveable counterweight mass is disposed away from the fulcrum of the beam and well load behind the lever effort of the beam.

16. The torque-reducing effort assistive counterbalance device for a beam pumping unit of claim 4 further comprising:
   a moveable counterweight mass on top of the counterweight, wherein the moveable counterweight mass resides externally on a frame extending sufficient distance above the beam at the lever effort of the beam so that the moveable counterweight mass sways in the air-arc to affect counterweight effect whose angular displacement changes by articulated swaying motion whereby the motive force of gravity effects movement of the counterweight mass to and fro externally on the frame thereby magnifying the weight transfer effect of the counterweight mass itself and thus increasing the torque reducing effect, wherein, the force of gravity repositions the moveable counterweight mass to achieve an increasing dynamic counterbalance effect as angular displacement of the shell is articulated in air to and fro;
      wherein the torque reducing effect is maintained by reduced effective counterbalance weight while the moveable counterweight mass is dynamically disposed in the air-arc near to the fulcrum of the beam and the well load in front of the lever effort of the beam; and
      wherein the torque reducing effect is maintained by increased effective counterbalance weight while the moveable counterweight mass is dynamically disposed in the air-arc away from the fulcrum of the beam and the well load in back the lever effort of the beam.

17. The torque-reducing effort assistive counterbalance device for a beam pumping unit of claim 4 wherein the articulated reciprocating counterweight sways in the air-arc while disposed off center either in front or behind the lever effort of the beam and the pitman arm.

18. The torque-reducing effort assistive counterbalance device for a beam pumping unit of claim 4 further comprising:
   crank arms having rotational direction from top to bottom such that downward motion is toward the well load, whereby the articulated reciprocating counterweight sways in the air-arc away from the fulcrum of the beam and well load thereby disposing the counterweight behind the lever effort of the beam; and
   and wherein when the crank arms have a rotational direction from bottom to top such that upward motion is away from the well load, the articulated reciprocating counterweight sways in the air-arc toward the fulcrum of the beam and well load thereby disposing the counterweight forward of the lever effort of the beam.

19. A counterweight-positioning balance-transfer device, comprising:
   a class 1 lever, said lever including a fulcrum and an unbalanced load; and
   a beam,
   wherein the load weight is greater when lifting the load than lowering the load; and an effort of the lever is pivotably connected to one or more pitman arms extending above a pivot axis of the lever and the beam at the lever effort articulating swaying of a counterweight in an air-arc in the air.

20. The counterweight-positioning balance-transfer device of claim 19 wherein:
the pitman arm or arms extend bi-directionally from the effort and connect to the articulated counterweight on a closed dead end of each the pitman arm or arms and connect to a crank arm wrist pin on a motive live end of each of the pitman arm or arms;
each said wrist pin is articulated with a crank arm rotating about a crank shaft, and
wherein a rotational direction of the crank arm is from top to bottom such that downward motion is toward a load of the lever; and
a mechanical geometric positioning of the articulated reciprocating counterweight by the rotation of each said wrist pin is rigidly translated through the pitman arm or arms and the effort at a pivot axis tail bearing to sway the counterweight in the air-arc to and fro; and
the articulated counterweight sways in the air-arc to and fro from near the fulcrum and the load and in front of the effort, to away from the fulcrum and the load and behind the effort.

21. The counterweight-positioning balance-transfer device of claim 19 wherein:
when the articulated counterweight sways in the air-arc away from the fulcrum and the load whereby the counterweight is disposed in back of the effort and the effective counterweight is increased; and
when the articulated counterweight sways in the air-arc nearer to the fulcrum and the load the counterweight is disposed forward of the effort and the effective counterweight is decreased; whereby,
a frictionless position change in the air-arc of the articulated counterweight reduces net torque required to lift and lower the load.

* * * * *